(12) United States Patent
Shoeb et al.

(10) Patent No.: US 12,221,211 B2
(45) Date of Patent: Feb. 11, 2025

(54) SEMANTIC ADJUSTMENT OF UNMANNED AERIAL VEHICLE DELIVERY POINTS

(71) Applicant: Wing Aviation LLC, Mountain View, CA (US)

(72) Inventors: Ali Shoeb, San Rafael, CA (US); Marcus Hammond, Redwood City, CA (US); Christopher Cobar, Shoreview, MN (US); Kyle Krafka, Los Altos, CA (US); Kyle Julian, Mountain View, CA (US); Kevin Jenkins, Dallas, TX (US)

(73) Assignee: Wing Aviation LLC, Palo Alto, CA (US)

( * ) Notice: Subject to any disclaimer, the term of this patent is extended or adjusted under 35 U.S.C. 154(b) by 278 days.

(21) Appl. No.: 17/657,538

(22) Filed: Mar. 31, 2022

(65) Prior Publication Data
US 2023/0312091 A1 Oct. 5, 2023

(51) Int. Cl.
*B64C 39/02* (2023.01)
*G05D 1/00* (2024.01)
(Continued)

(52) U.S. Cl.
CPC ......... *B64C 39/024* (2013.01); *G05D 1/0094* (2013.01); *G05D 1/042* (2013.01);
(Continued)

(58) Field of Classification Search
CPC .... B64C 39/024; G05D 1/0094; G05D 1/042; G06V 20/17; G06V 20/58; B64U 2101/60;
(Continued)

(56) References Cited

U.S. PATENT DOCUMENTS 9,359,074 B2 6/2016 Ganesh et al.
9,580,173 B1 2/2017 Burgess et al.
(Continued)

FOREIGN PATENT DOCUMENTS

CN 109977924 A 7/2019
CN 107444665 6/2020
WO 2021133385 W 7/2021

OTHER PUBLICATIONS

Lee et al., "UAV Flight and Landing Guidance System for Emergency Situations," Sensors, 2019, 21 pages, vol. 19, No. 4468, https://doi.org/10.3390/s19204468.
(Continued)

*Primary Examiner* — Peter D Nolan
*Assistant Examiner* — Demetra R Smith-Stewart
(74) *Attorney, Agent, or Firm* — McDonnell Boehnen Hulbert & Berghoff LLP

(57) ABSTRACT

A method includes capturing, by a sensor on an unmanned aerial vehicle (UAV), an image of a delivery location. The method further includes determining, based on the image of the delivery location, a segmentation image. The segmentation image segments the delivery location into a plurality of pixel areas with corresponding semantic classifications. The method also includes determining, based on the segmentation image, a distance-to-obstacle image of a delivery zone at the delivery location. The distance-to-obstacle image comprises a plurality of pixels, each pixel representing a distance in the segmentation image from a nearest pixel area with a semantic classification indicative of an obstacle in the delivery location. Additionally, the method includes selecting, based on the distance-to-obstacle image, a delivery point in the delivery zone. The method also includes positioning the UAV above the delivery point in the delivery zone for delivery of a payload.

20 Claims, 17 Drawing Sheets

(51) Int. Cl.
*G05D 1/04* (2006.01)
*G06V 20/17* (2022.01)
*G06V 20/58* (2022.01)
*B64U 101/60* (2023.01)
*G06Q 10/08* (2023.01)

(52) U.S. Cl.
CPC .............. *G06V 20/17* (2022.01); *G06V 20/58* (2022.01); *B64U 2101/60* (2023.01); *B64U 2201/10* (2023.01); *B64U 2201/20* (2023.01); *G06Q 10/08* (2013.01)

(58) Field of Classification Search
CPC ............ B64U 2201/10; B64U 2201/20; G06Q 10/08; G08G 5/0052; G08G 5/045; G08G 5/0021
See application file for complete search history.

(56) References Cited

U.S. PATENT DOCUMENTS

| | | | |
|---|---|---|---|
| 10,019,907 | B2 | 7/2018 | Kanade et al. |
| 10,049,589 | B1 | 8/2018 | Boyd et al. |
| 10,121,117 | B1* | 11/2018 | Boyd .................... G06V 10/751 |
| 10,198,955 | B1* | 2/2019 | Boyd .................... G08G 5/045 |
| 10,353,388 | B2 | 7/2019 | Schubert et al. |
| 10,679,509 | B1 | 6/2020 | Yarlagadda |
| 11,195,011 | B2 | 12/2021 | Klaus |
| 11,242,144 | B2 | 2/2022 | Holtz et al. |
| 2017/0286892 | A1 | 10/2017 | Studnicka |
| 2018/0259960 | A1 | 9/2018 | Cuban et al. |
| 2019/0041219 | A1* | 2/2019 | Schubert ............ G01C 21/3602 |
| 2019/0087635 | A1 | 3/2019 | Klaus |
| 2019/0286153 | A1 | 9/2019 | Rankawat et al. |
| 2020/0207474 | A1 | 7/2020 | Foggia et al. |
| 2021/0026355 | A1 | 1/2021 | Chen et al. |
| 2021/0224556 | A1 | 7/2021 | Xu et al. |
| 2021/0286377 | A1 | 9/2021 | Zhu et al. |
| 2021/0365881 | A1 | 11/2021 | Park et al. |
| 2021/0374975 | A1* | 12/2021 | Shoeb .................... G06T 7/174 |
| 2022/0066456 | A1* | 3/2022 | Ebrahimi Afrouzi ........................ G06F 3/04883 |

OTHER PUBLICATIONS

Pluckter et al., "Precision UAV Landing in Unstructured Environments," Proceedings of the 2018 International Symposium on Experimental Robotics, ISER 2018, Springer Proceedings in Advanced Robotics, 2018, 10 pages, vol. 11, https://doi.org/10.1007/978-3-030-33950-0_16.

* cited by examiner

SEMANTIC ADJUSTMENT OF UNMANNED AERIAL VEHICLE DELIVERY POINTS

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Examples disclosed herein include methods for nudging delivery points to avoid collisions caused by delivering onto and/or in close proximity to various obstacles. A UAV may determine a segmentation image based on an image of a delivery location such that the segmentation image identifies pixel areas associated with obstacles. Based on the segmentation image, the UAV may determine a distance-to-obstacle image, where each pixel in the distance-to-obstacle image represents a distance in the segmentation image from a nearest pixel area associated with an obstacle semantic classification. The UAV may select a nudged delivery point and position itself above the nudged delivery point based on the distance-to-obstacle image in order to deliver a payload.

In a first aspect, a method includes capturing, by a sensor on an unmanned aerial vehicle (UAV), an image of a delivery location. The method further includes determining, based on the image of the delivery location, a segmentation image. The segmentation image segments the delivery location into a plurality of pixel areas with corresponding semantic classifications. The method also includes determining, based on the segmentation image, a distance-to-obstacle image of a delivery zone at the delivery location. The distance-to-obstacle image comprises a plurality of pixels, each pixel representing a distance in the segmentation image from a nearest pixel area with a semantic classification indicative of an obstacle in the delivery location. Additionally, the method includes selecting, based on the distance-to-obstacle image, a delivery point in the delivery zone. The method also includes positioning the UAV above the delivery point in the delivery zone for delivery of a payload.

In a second aspect, an unmanned aerial vehicle (UAV) comprises a sensor and a control system. The control system is configured to capture, by a sensor on an unmanned aerial vehicle (UAV), an image of a delivery location. The control system is further configured to determine, based on the image of the delivery location, a segmentation image. The segmentation image segments the delivery location into a plurality of pixel areas with corresponding semantic classifications. The control system is further configured to determine, based on the segmentation image, a distance-to-obstacle image of a delivery zone at the delivery location. The distance-to-obstacle image comprises a plurality of pixels, each pixel representing a distance in the segmentation image from a nearest pixel area with a semantic classification indicative of an obstacle in the delivery location. Additionally, the control system is configured to select, based on the distance-to-obstacle image, a delivery point in the delivery zone. The control system is also configured to position the UAV above the delivery point in the delivery zone for delivery of a payload.

In a third aspect, a non-transitory computer-readable medium comprises program instructions executable by one or more processors to perform operations comprising capturing, by a sensor on an unmanned aerial vehicle (UAV), an image of a delivery location. The operations further include determining, based on the image of the delivery location, a segmentation image. The segmentation image segments the delivery location into a plurality of pixel areas with corresponding semantic classifications. The operations also include determining, based on the segmentation image, a distance-to-obstacle image of a delivery zone at the delivery location. The distance-to-obstacle image comprises a plurality of pixels, each pixel representing a distance in the segmentation image from a nearest pixel area with a semantic classification indicative of an obstacle in the delivery location. Additionally, the operations include selecting, based on the distance-to-obstacle image, a delivery point in the delivery zone. The operations also include positioning the UAV above the delivery point in the delivery zone for delivery of a payload.

These, as well as other aspects, advantages, and alternatives, will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
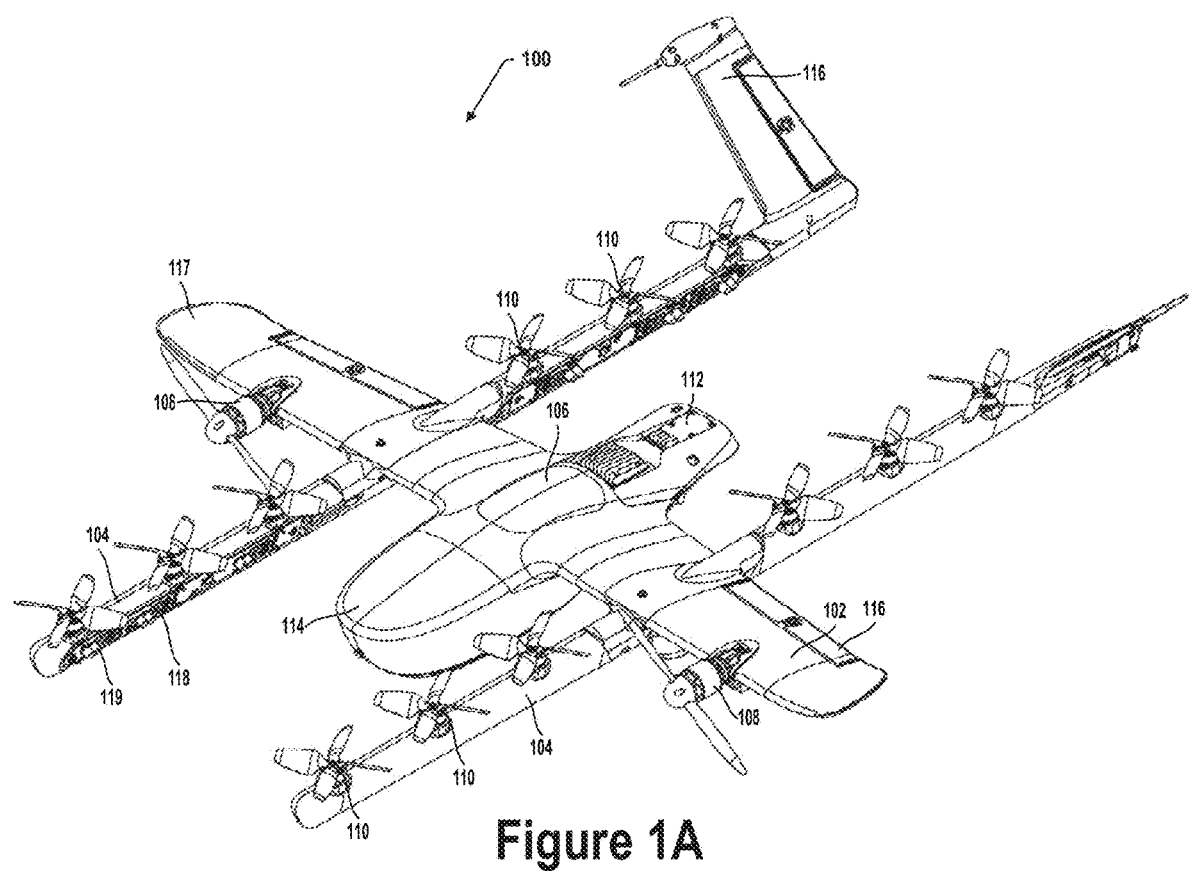
FIG. 1A is a simplified illustration of an unmanned aerial vehicle, according to example embodiments, in accordance with example embodiments.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

An example usage of UAVs may be to deliver various items to customers. For example, a UAV may be tasked with picking up a payload containing an item from a location and delivering the payload to a customer's residence, commercial building, or other location. One potential problem that might arise in this delivery process is determining an appropriate delivery point to safely deliver the payload. An initial delivery point positioned next to the customer's house or commercial building or otherwise located at an address could be obstructed by various obstacles, such as trees, roads, sidewalks, cars, among other examples. Delivering the payload while being in proximity to one of these obstacles could damage the UAV, the payload, the contents of the payload, and/or the obstacle.

Therefore, when the UAV is delivering the payload, it may be important to ensure that the payload is dropped off at a delivery point that does not disrupt activities in the surrounding area, e.g., that the payload is dropped off at a delivery point relatively free of obstacles. For example, the UAV could navigate to drop off a customer's package next to the customer's garage pathway rather than the sidewalk next to the customer's house if the customer's sidewalk is obstructed by a tree. As another example, the customer's home could be in a forest, and the UAV could determine to abort the delivery due to all the obstacles in the environment.

Provided herein are methods for evaluating and/or adjusting delivery points to avoid collisions caused by delivering onto and/or in close proximity to various obstacles. In some examples, the UAV may intend to deliver to an initial delivery point. After navigating to that initial delivery point, the UAV may detect, perhaps through an image captured using a sensor on the UAV, that the initial delivery point is fairly close to one or more obstacles. In response to that determination, the UAV could determine a nudged delivery point within a certain distance of the initial delivery point, where the nudged delivery point is farther away from its nearest obstacle than the initial delivery point is from its nearest obstacle. And the UAV could evaluate whether that nudged delivery point is an appropriate point to which to deliver the payload. If the nudged delivery point is an appropriate point to which to deliver the payload, the UAV could navigate to deliver the payload at the nudged delivery point instead of the initial delivery point.

In some examples, determining the initial delivery point may involve determining a segmentation image based on a delivery location image captured by the UAV. The segmentation image may depict one or more pixel areas categorized into various semantic classifications. For example, the segmentation image could depict areas of the image categorized as being representative of vegetation, building, road, vehicle, sidewalk, or lawn, among other semantic classifications. These semantic classifications may also be categorized as an obstacle or not an obstacle. For example, buildings, vegetation, roads, and vehicles may all be categorized as obstacles, whereas lawns and sidewalks may be categorized as not obstacles.

Based on the segmentation image, the UAV could determine a distance-to-obstacle image to facilitate determining a nudged delivery point. The distance-to-obstacle image could include one or more pixels, and each pixel could be representative of a distance in the segmentation image from a nearest pixel area with a semantic classification indicative of an obstacle in the delivery location. For example, for a point in the segmentation image, the UAV could calculate the distance from that point in the segmentation image to each of the pixel areas with a semantic classification of an obstacle in the segmentation image. The UAV could compare these distances to determine the smallest distance to an obstacle, which may be designated as the distance represented by that pixel.

Further, the UAV may only determine the distance-to-obstacle image for an area within a delivery zone at the delivery location. For example, the delivery zone may be a two meter radius around the initial delivery point, and the UAV may only determine the distance-to-obstacle image for the area within that two meter radius. Determining the distance-to-obstacle image for only a portion of the image may save computation space and time, as an image could have several hundred pixels and several areas indicated to be obstacles. Calculating the distance for each pixel to each obstacle could also be unnecessary, as it may be preferable for the UAV to never deliver a payload too far away (e.g., beyond two meters) from the intended delivery point.

After determining the distance-to-obstacle image for an area, the UAV could select a delivery point in the delivery zone. In some examples, this selected delivery point could be a delivery point in the delivery zone having the farthest distance away from an obstacle, e.g., a delivery point at the delivery location being associated with a pixel having the largest distance away from the nearest obstacle. In some examples, height of an obstacle may also be taken into account when selecting a delivery point. For example, the UAV may select a delivery point that is the farthest away from the tallest obstacle. Further, in some examples, the UAV could select a nudged delivery point in the delivery zone based on the nudged delivery point having a smallest distance away from the initial delivery point while also satisfying a clearance criteria. For instance, the clearance criteria may specify a requirement that the nudged delivery point is at least a threshold distance away from the nearest obstacle. Other factors may also be considered when selecting a delivery point, including prioritizing avoiding areas with a particular classification (e.g., roads where payloads could cause accidents or become damaged).

After selecting the delivery point, the UAV could position itself above the delivery point in the delivery zone for delivery of the payload. As mentioned, this delivery point could be a nudged delivery point that is proximate to the initial delivery point.

In some examples, the UAV could follow a descending trajectory to position itself from being above the initial delivery point to be above the nudged delivery point. For example, the UAV could start descending at a first altitude above the initial delivery point and the UAV could stop descending at a second, lower altitude above the nudged delivery point. In some examples, the UAV could vertically descend further after navigating above the nudged delivery point to deliver the payload.

After delivering the payload to the nudged delivery point, the UAV could navigate back above the initial delivery point by navigating through an ascending trajectory. Namely, the UAV could navigate from a third altitude above the nudged delivery point to a fourth, higher altitude above the initial delivery point. Navigating above the initial delivery point before departing from the delivery location may allow the UAV to safely depart from the delivery location. More specifically, after navigating back above the initial delivery location, the UAV may vertically ascend through an area already traversed by the UAV to depart from the delivery location.

In some examples, the ascending trajectory followed by the UAV to navigate from above the nudged delivery point to above the initial delivery point is a different trajectory from the initially followed descending trajectory. More specifically, the fourth altitude of the ascending trajectory could be different from the first altitude of the descending trajectory and/or the third altitude of the ascending trajectory could be different from the second altitude of the descending trajectory.

One potential problem that might arise when navigating the ascending trajectory from above the nudged delivery point back above the initial delivery point is that the UAV might collide with an obstacle on the way back up. For example, the UAV could follow a descending trajectory that narrowly avoids a tree. If the UAV follows the same trajectory to ascend, the UAV could potentially collide into the tree if there are any inaccuracies or extraneous factors (e.g., the UAV might not be able to precisely follow the exact trajectory and clips the tree, or wind forces the tree branches closer to the UAV). Therefore, it could be advantageous for the ascending trajectory to traverse an area above the descending trajectory, e.g., for the fourth altitude of the ascending trajectory to be higher than the first altitude of the descending trajectory, among other examples.

Further, in some examples, the UAV could include a tether that lowers the payload onto the ground to complete a delivery. The tether may still be partially extended for at least part of the ascending trajectory. Retracting the tether while the UAV departs from the delivery location may reduce the total amount of time the UAV takes to deliver an item. However, one issue that might arise due to the UAV navigating with a partially extended tether is that the tether might swing uncontrollably, which may cause collisions with various obstacles. Therefore, in order to avoid obstacles and/or reduce swinging of the tether, the UAV could navigate through the ascending trajectory at a slower horizontal speed than the descending trajectory.

Another issue that might arise during delivery of the payload is that the area around the delivery point may be too full of obstacles to safely deliver the payload. Therefore, in some examples, the UAV could evaluate one or more delivery points to determine whether to deliver the payload or whether to abort the delivery.

For example, the UAV could evaluate both or either of the initial delivery point and the nudged delivery point. In some examples, if the surrounding area of the initial delivery point is too full of obstacles, then the UAV could abort the delivery instead of determining a nudged delivery point. In further examples, if the UAV determines a nudged delivery point, the UAV could then evaluate the surrounding area of the nudged delivery point. If the surrounding area of the nudged delivery point is too full of obstacles, then the UAV could then abort the delivery. The surrounding area may be a predefined area around the delivery point (e.g., within two meters of the delivery point in all lateral directions). In some examples, the abort process may be executed by a separate software module which serves as an extra precautionary check for the software module that determined the nudged delivery point.

To evaluate the surrounding area of a delivery point to determine whether to abort delivery of the payload, the UAV could determine a segmentation image or use the same segmentation image used to determine the nudged delivery point. As mentioned, the segmentation image could be based on an image of a delivery location and may segment the delivery location into one or more pixel areas with corresponding semantic classifications. Each semantic classification could be associated with an obstacle or not associated with an obstacle.

The UAV could evaluate each pixel within the surrounding area of the delivery point, and determine a percentage of pixels in the surrounding area with a corresponding semantic classification indicative of an obstacle, and the UAV could determine whether this percentage of pixels is above a threshold percentage. For example, the delivery point could be in a wooded area, and the UAV could determine that the percentage of obstacle pixels within the surrounding area of the delivery point with a corresponding semantic classification indicative of an obstacle is 90%. The threshold percentage to abort delivery could be 60%. Based on the determined percentage of obstacle pixels being 90%, which is above 60%, the UAV could determine that it may be difficult to safely deliver the payload without colliding with an obstacle and abort delivery of the payload. As another example, if the delivery point is in a new suburban neighborhood with few grown trees and other obstacles, the UAV could determine that the percentage of obstacle pixels within the surrounding area of this delivery point is 20%. Based on this determined percentage of obstacle pixels being 20%, which is less than 60%, the UAV could determine that the payload could confidently be delivered safely, and continue the delivery process.

In some examples, the threshold percentage can be adjusted based on various factors, including, for example, the dimensions of the payload. For example, if the payload is large, then the UAV could compare the determined percentage of obstacle pixels to a lower threshold percentage to allow for less obstacles to be in the surrounding area of the delivery location. If the payload is small, then the UAV could compare the determined percentage of obstacle pixels to a higher threshold percentage to allow for more obstacles to be in the surrounding area of the delivery location and increase the chance that the payload is successfully delivered.

II. Example Unmanned Vehicles

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
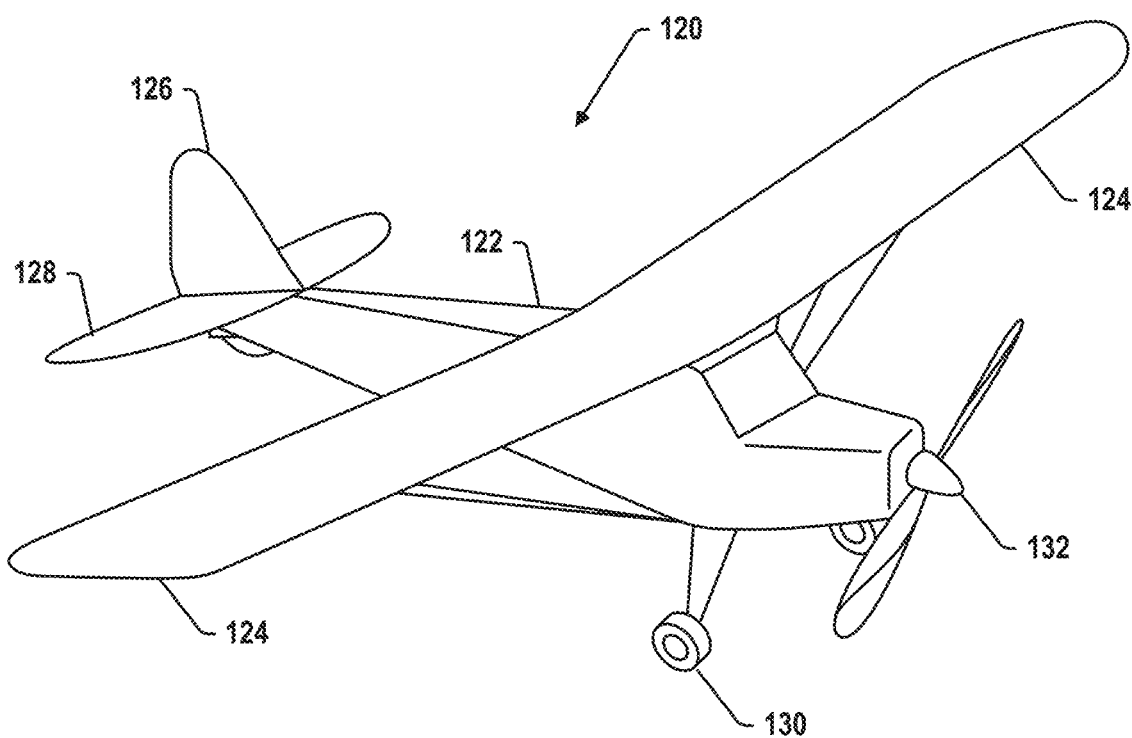
FIG. 1B is a simplified illustration of an unmanned aerial vehicle, according to example embodiments, in accordance with example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
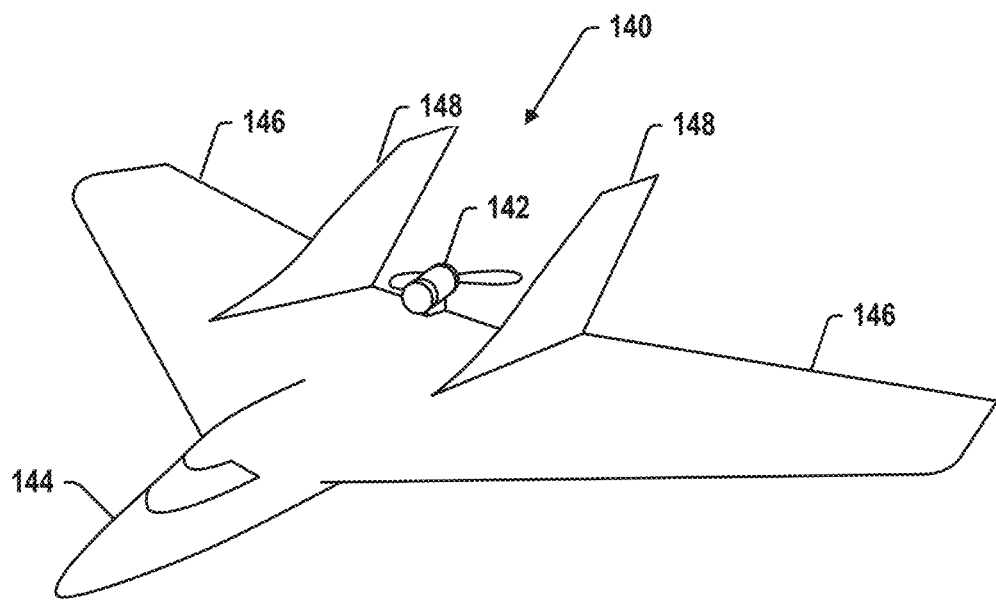
FIG. 1C is a simplified illustration of an unmanned aerial vehicle, according to example embodiments, in accordance with example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
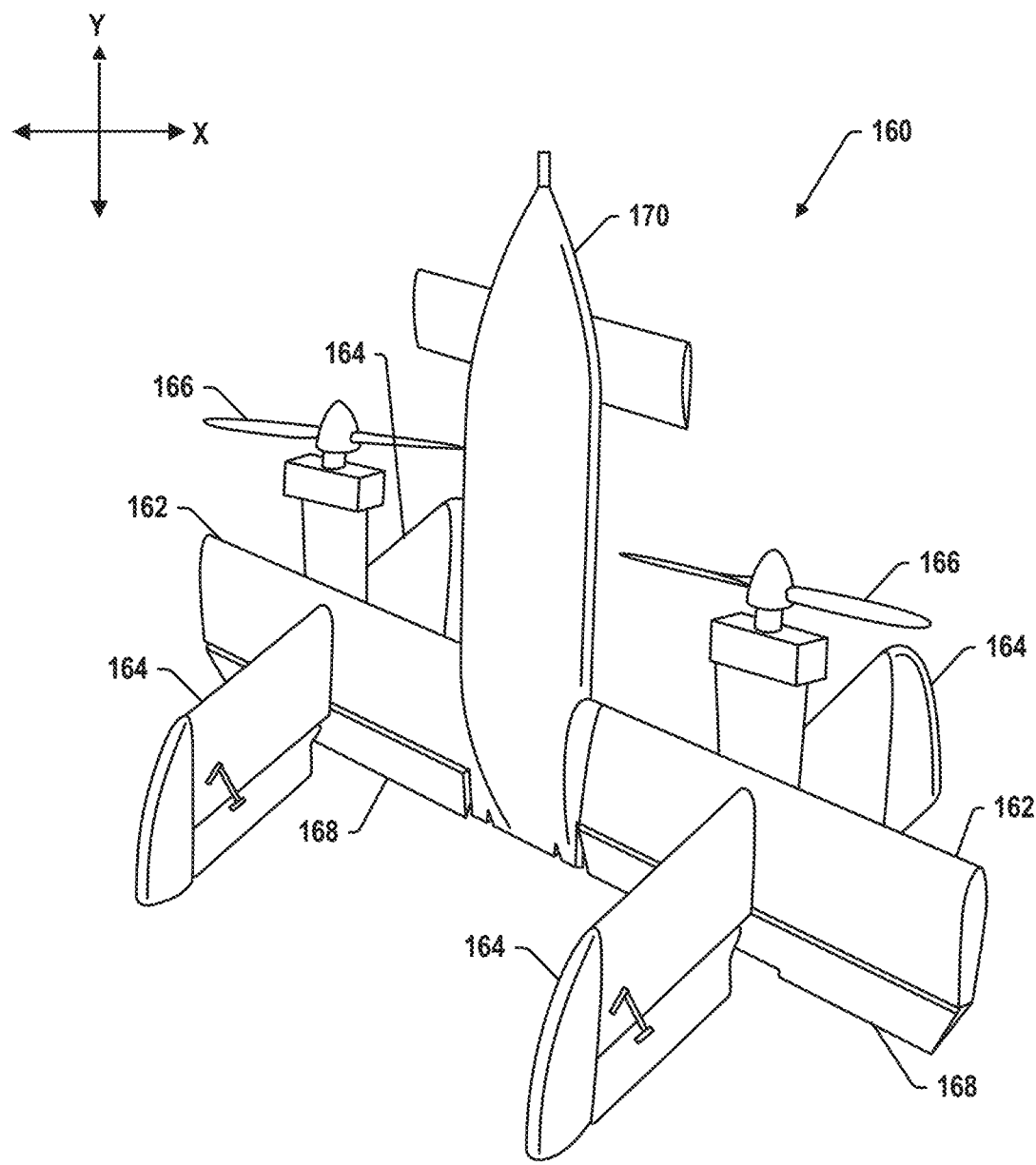
FIG. 1D is a simplified illustration of an unmanned aerial vehicle, according to example embodiments, in accordance with example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
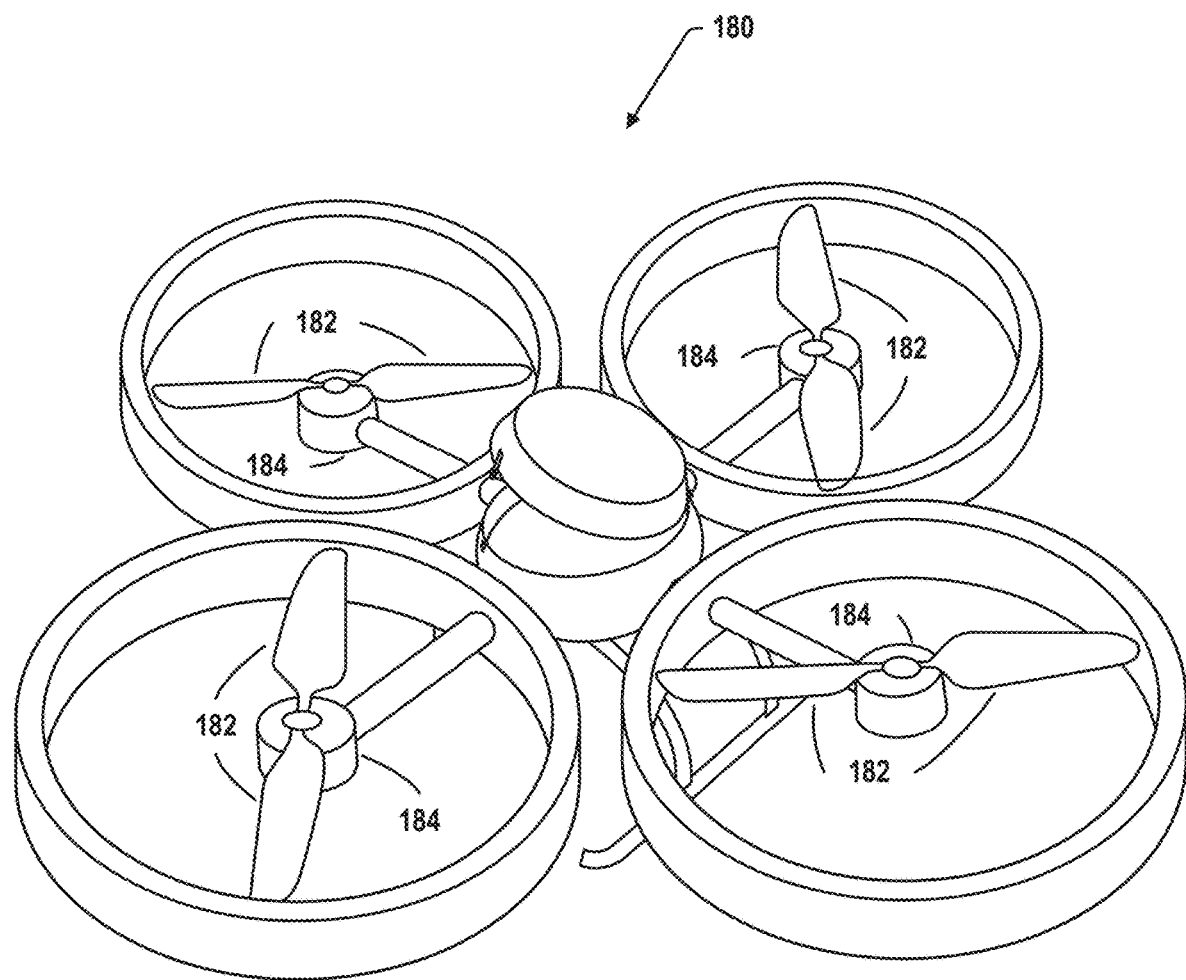
FIG. 1E is a simplified illustration of an unmanned aerial vehicle, according to example embodiments, in accordance with example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
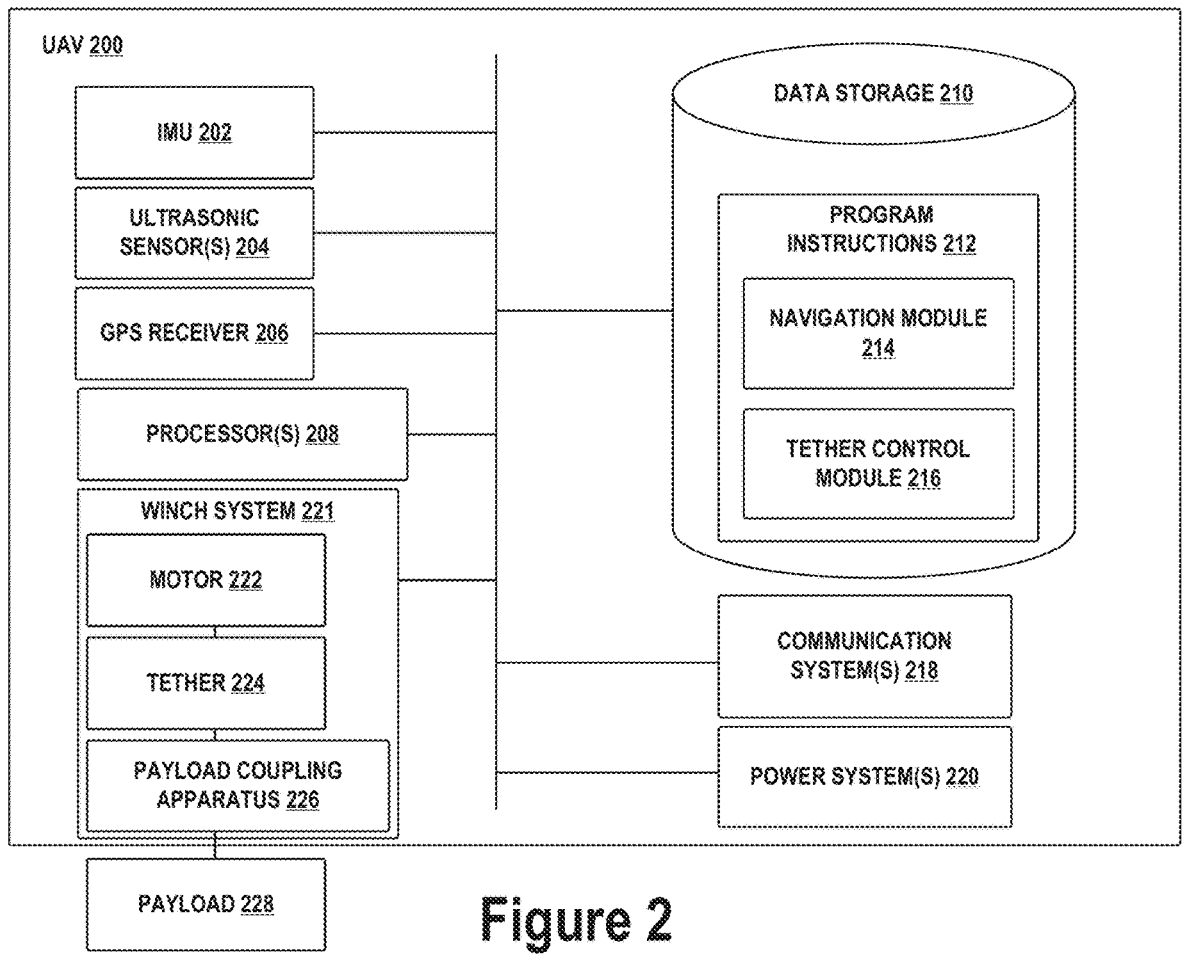
FIG. 2 is a simplified block diagram illustrating components of an unmanned aerial vehicle, in accordance with example embodiments.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

i. A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

i. B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron (s), and/or the speed of its propeller(s)) in order to effectuate such movements. The remote computing system may then communicate such adjustments to the UAV 200 so it can move in the determined manner.

i. C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot," or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

i. D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

i. E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV.

In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operation specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
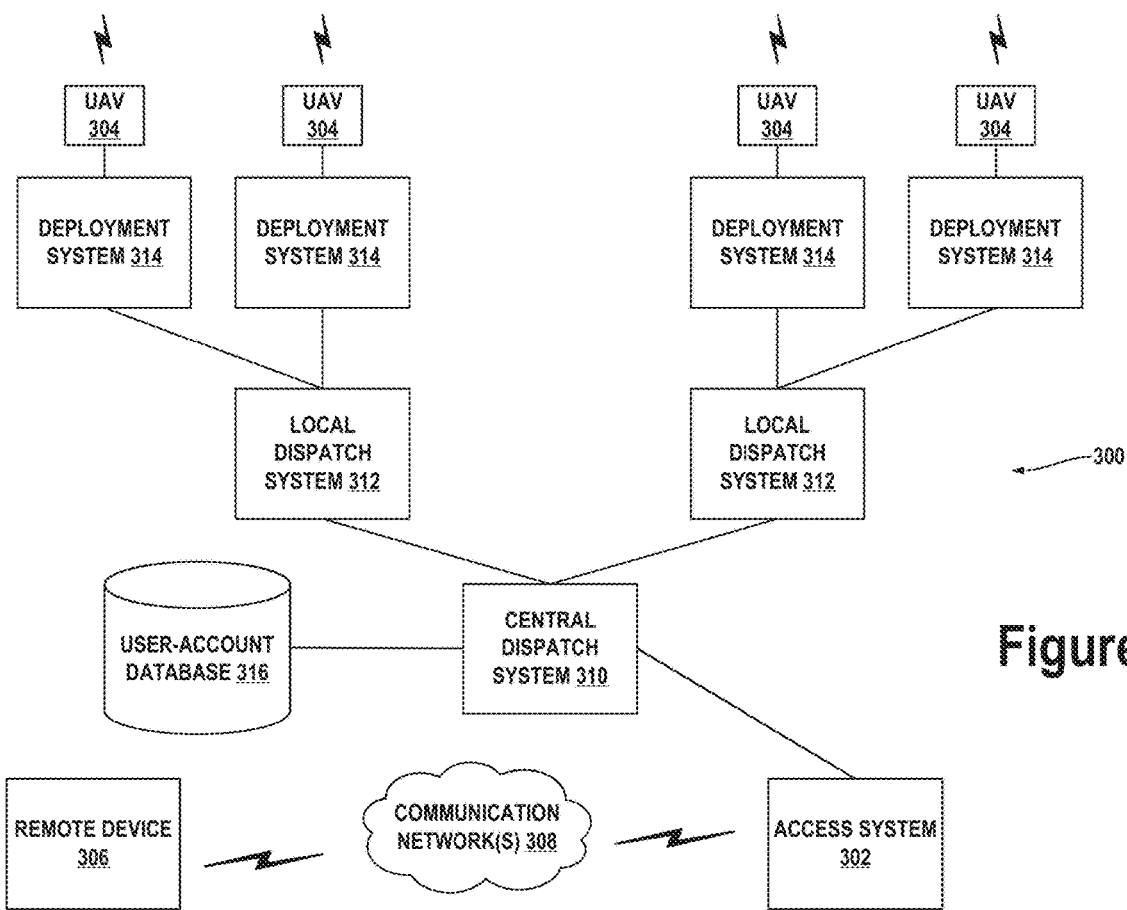
FIG. 3 is a simplified block diagram illustrating a UAV system, in accordance with example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system (s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Machine Learning Models for Generating Inferences/Predictions

Figure 4:
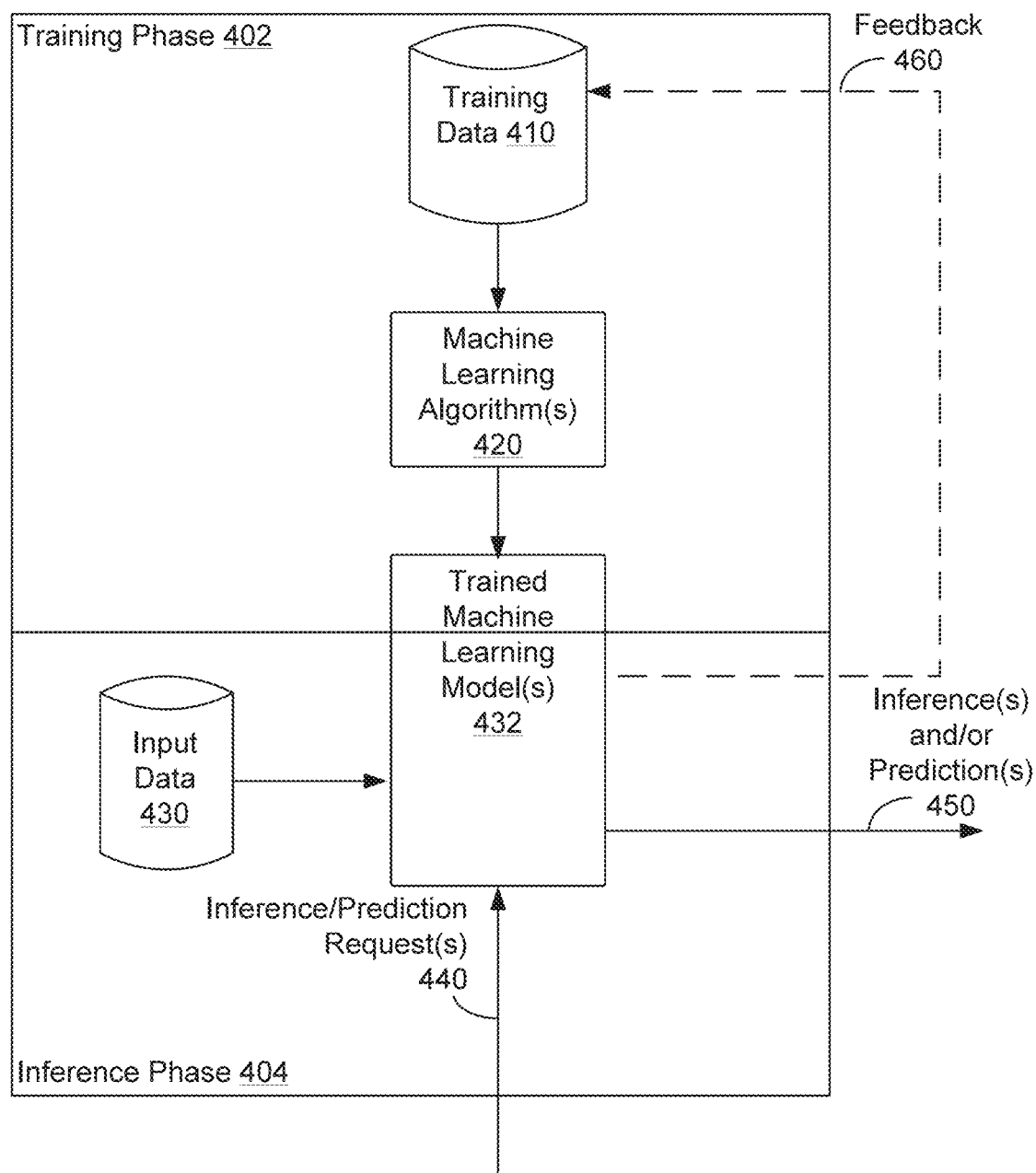
FIG. 4 is a diagram illustrating training and inference phases of a machine learning model, in accordance with example embodiments.

A UAV may be configured to use one or more machine learning models to facilitate perception, localization, navigation, and/or other UAV operations. FIG. 4 shows diagram 400 illustrating a training phase 402 and an inference phase 404 of trained machine learning model(s) 432, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 4 shows training phase 402 where one or more machine learning algorithms 420 are being trained on training data 410 to become trained machine learning model 432. Then, during inference phase 404, trained machine learning model 432 can receive input data 430 and one or more inference/prediction requests 440 (perhaps as part of input data 430) and responsively provide as an output one or more inferences and/or predictions 450.

As such, trained machine learning model(s) 432 can include one or more models of one or more machine learning algorithms 420. Machine learning algorithm(s) 420 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 420 may be supervised or unsupervised, and may implement any suitable combination of online and offline learning.

In some examples, machine learning algorithm(s) 420 and/or trained machine learning model(s) 432 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 420 and/or trained machine learning model(s) 432. In some examples, trained machine learning model(s) 432 can be trained, reside, and execute to provide inferences on a particular UAV or other computing device, and/or otherwise can make inferences for the particular UAV or other computing device.

During training phase 402, machine learning algorithm(s) 420 can be trained by providing at least training data 410 as training input using unsupervised, supervised, semi-supervised, and/or reinforcement learning techniques. Unsupervised learning involves providing a portion (or all) of training data 410 to machine learning algorithm(s) 420 and machine learning algorithm(s) 420 determining one or more output inferences based on the provided portion (or all) of training data 410. Supervised learning involves providing a portion of training data 410 to machine learning algorithm(s) 420, with machine learning algorithm(s) 420 determining one or more output inferences based on the provided portion of training data 410, and the output inference(s) are either accepted or corrected based on correct results associated with training data 410. In some examples, supervised learning of machine learning algorithm(s) 420 can be governed by a set of rules and/or a set of labels for the training input, and the set of rules and/or set of labels may be used to correct inferences of machine learning algorithm(s) 420. Supervised learning of machine learning algorithm(s) 420 may include training data 410 provided by human operators and/or a trusted dataset, which may in some examples be provided by a third party.

Semi-supervised learning involves having correct results for part, but not all, of training data 410. During semi-supervised learning, supervised learning is used for a portion of training data 410 having correct results, and unsupervised learning is used for a portion of training data 410 not having correct results. Reinforcement learning involves machine learning algorithm(s) 420 receiving a reward signal regarding a prior inference, where the reward signal can be a numerical value. During reinforcement learning, machine learning algorithm(s) 420 can output an inference and receive a reward signal in response, where machine learning algorithm(s) 420 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 420 and/or trained machine learning model(s) 432 can be trained using other machine learning techniques, including but not limited to, incremental learning and curriculum learning.

In some examples, machine learning algorithm(s) 420 and/or trained machine learning model(s) 432 can use transfer learning techniques. For example, transfer learning techniques can involve trained machine learning model(s) 432 being pre-trained on one set of data and additionally trained using training data 410. More particularly, machine learning algorithm(s) 420 can be pre-trained on data from one or more computing devices and a resulting trained machine learning model provided to a UAV, where the UAV is intended to execute the trained machine learning model during inference phase 404. Then, during training phase 402, the pre-trained machine learning model can be additionally trained using training data 410, where training data 410 can be derived from the UAV. This further training of the machine learning algorithm(s) 420 and/or the pre-trained machine learning model using training data 410 of the UAV's own data can be performed using either supervised or unsupervised learning. Once machine learning algorithm(s) 420 and/or the pre-trained machine learning model has been trained on at least training data 410, training phase 402 can be completed. The trained resulting machine learning model can be utilized as at least one of trained machine learning model(s) 432.

In particular, once training phase 402 has been completed, trained machine learning model(s) 432 can be provided to a UAV, if not already on the UAV. Inference phase 404 can begin after trained machine learning model(s) 432 are provided to the UAV During inference phase 404, trained machine learning model(s) 432 can receive input data 430 and generate and output one or more corresponding inferences and/or predictions 450 about input data 430. As such, input data 430 can be used as an input to trained machine learning model(s) 432 for providing corresponding inference(s) and/or prediction(s) 450 to a UAV. For example, trained machine learning model(s) 432 can generate inference(s) and/or prediction(s) 450 in response to one or more inference/prediction requests 440. Input data 430 can include data from a first UAV executing trained machine learning model(s) 432 and/or input data from one or more other UAVs.

In some examples, input data 430 can include a collection of images provided by one or more sources. The collection of images can include still images, video frames, images resident on a UAV, and/or other images. In some examples, input data 430 may include one or more two-dimensional (2D) images captured by a ground-facing camera on a UAV and representative of an environment of the UAV. The images of the environment may include, among other possibilities, a terrain beneath the UAV when the UAV is navigating from a starting location to a target location. The images of the environment may also include a delivery zone to which the UAV is tasked with delivering a payload. Other types of input data are possible as well.

Inference(s) and/or prediction(s) 450 can include output images, output intermediate images, numerical values, and/or other output data produced by trained machine learning model(s) 432 operating on input data 430 (and training data 410). In some examples, trained machine learning model(s) 432 can use output inference(s) and/or prediction(s) 450 as input feedback 460. Trained machine learning model(s) 432 can also rely on past inferences as inputs for generating new inferences.

In some examples, an output image included within inference(s) and/or prediction(s) 450 may be a semantic segmentation image, also referred to herein as a semantic image or a segmentation image. The semantic segmentation image may include semantic labels, which may also be referred to herein as semantic classifications. The semantic labels may be selected from a predetermined set of labels. In some examples, the set of labels may include labels representing buildings, roads, vegetation, vehicles, driveways, lawns, and sidewalks. In further examples, other labels may be included within a set of semantic labels as well or instead.

In further examples, an output image included within inference(s) and/or prediction(s) 450 may be a depth image. Each pixel of the depth image may represent depth, or distance of the pixel to an imaging device which captured the image. In examples where the camera is a 2D camera, the depth image generated by a machine learning model may be referred to as a monocular depth image.

Output images included within inference(s) and/or prediction(s) 450 may be used by a UAV to facilitate UAV localization, navigation, payload delivery, and/or other deployment operations. In further examples, inference(s) and/or prediction(s) 450 may include other types of output data, which may be used to facilitate the same or different UAV deployment operations as well or instead.

VI. Data Collection and Processing for Semantic Analysis

In some examples, a UAV may navigate to a delivery location and verify that an initial delivery point at the delivery location is still an optimal point for delivery of the payload. In some examples, if the UAV detects changes to the delivery location (e.g., an overgrown tree obstructing or in close proximity to the initial delivery point), the UAV may nudge the delivery point and/or abort delivery of the payload. Upon navigating to the delivery location, the UAV could capture one or more images of the delivery location to facilitate determining and evaluating delivery points.

Figure 5:
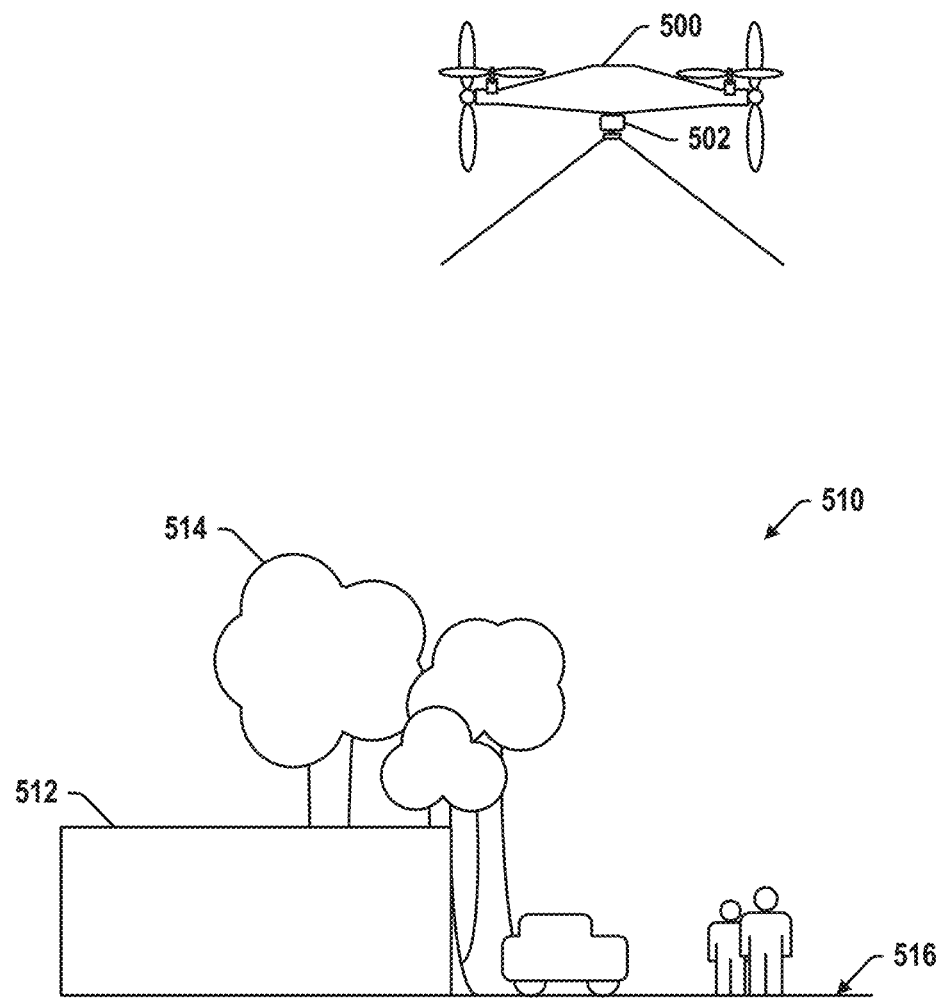
FIG. 5 illustrates a UAV capturing an image of a delivery location, in accordance with example embodiments.

FIG. 5 illustrates UAV 500 capturing an image of delivery location 510, in accordance with example embodiments. UAV 500 may have a configuration similar to example UAVs discussed above, e.g., UAV 100. In some examples, UAV 500 may include sensor 502, which may be a camera (e.g., a 2D RGB camera) that faces downward. UAV 500 may control sensor 502 to take images of the environment to determine where to navigate to avoid obstacles, among other uses. These images may be representative of the location below the UAV.

Further, UAV 500 may include other sensor arrangements, e.g., depth sensor arrangements. In some examples, these depth sensor arrangements could include two or more cameras that work in conjunction to facilitate depth perception. Depth sensor arrangements could also include a single depth sensor, e.g., a LIDAR sensor. These sensor arrangements could help provide further information about the delivery location, including heights of obstacles to be avoided, among other information.

In the example depicted by FIG. 5, delivery location 510 includes building 512, trees 514, and ground surface 516, among other elements. Some of the elements of delivery location 510, e.g., building 512 and trees 514 may be obstacles that may need to be avoided while delivering a payload, whereas other elements of delivery location 510, e.g., ground surface 516 may be reasonable locations to deliver a payload.

Figure 6:
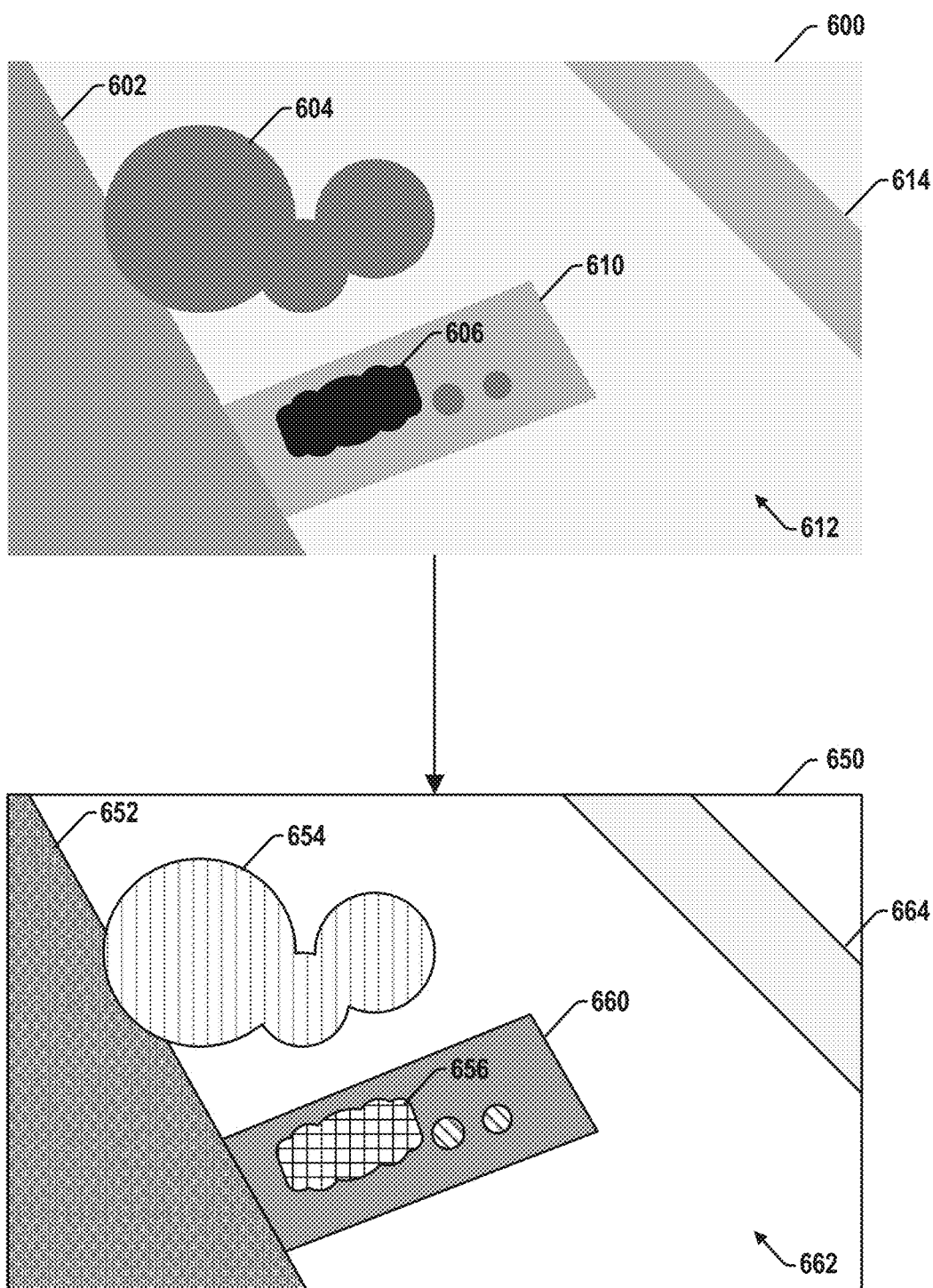
FIG. 6 illustrates an image and a segmentation image, in accordance with example embodiments.

FIG. 6 illustrates image 600 and segmentation image 650, in accordance with example embodiments. UAV 500 may have captured image 600 of delivery location 510. In some examples, image 600 may be a 2D image captured by sensor 502 of UAV 500. Image 600 includes various elements of delivery location 510, e.g., element 602 representing building 512, element 604 representing trees 514, and element 612 representing ground surface 516.

To determine which elements of image 600 are obstacles, UAV 500 may input captured image 600 into a trained machine learning model to obtain segmentation image 650, which may include semantic classifications. As mentioned, these semantic classifications may describe pixels or pixel areas within the image, e.g., as trees, roads, or sidewalks, among other semantic classifications.

For example, segmentation image 650 may classify element 602 into building pixel area 652, element 604 into tree pixel area 654, element 606 into vehicle pixel area 656, element 614 into sidewalk pixel area 664, element 610 into driveway pixel area 660, and element 612 into ground pixel area 662. Each of these segmentation classifications may be indicative of an obstacle or may not be indicative of an obstacle. For example, the pixel areas having a segmentation classification of building, tree, and vehicle (e.g., building pixel area 652, tree pixel area 654, and vehicle pixel area 656) may all be indicative of obstacles, and therefore indicative of pixel areas to be avoided. Other pixel areas having a segmentation classification not indicative of an obstacle, e.g., driveway pixel area 660, ground pixel area 662, and sidewalk pixel area 664, may be indicative of pixel areas where the UAV may deliver the payload.

VII. Semantic Nudging

Figure 7:
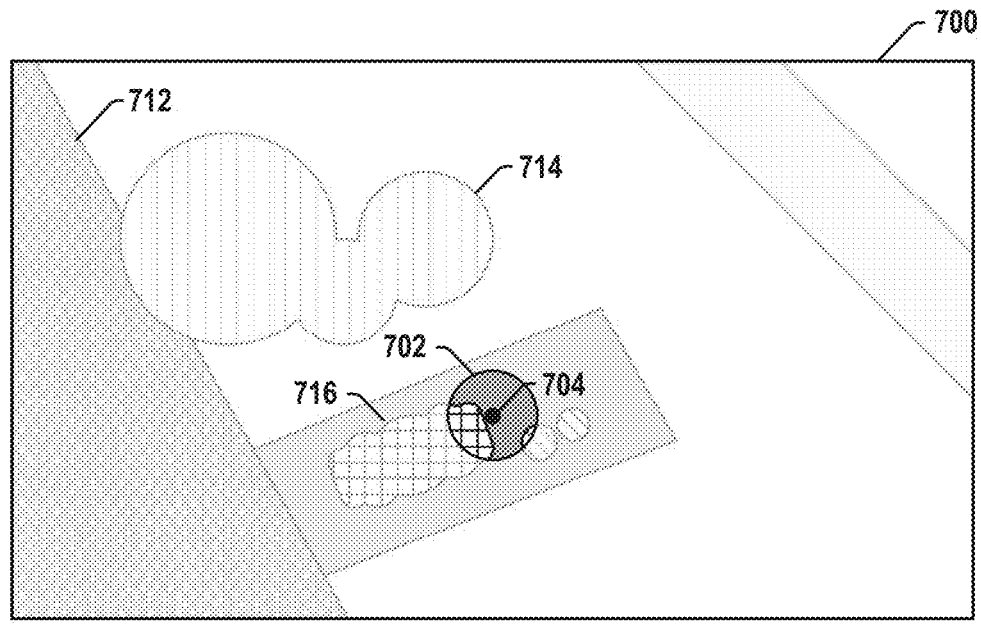
FIG. 7 illustrates an initial delivery point and a nudged delivery point, in accordance with example embodiments.
Figure 7:
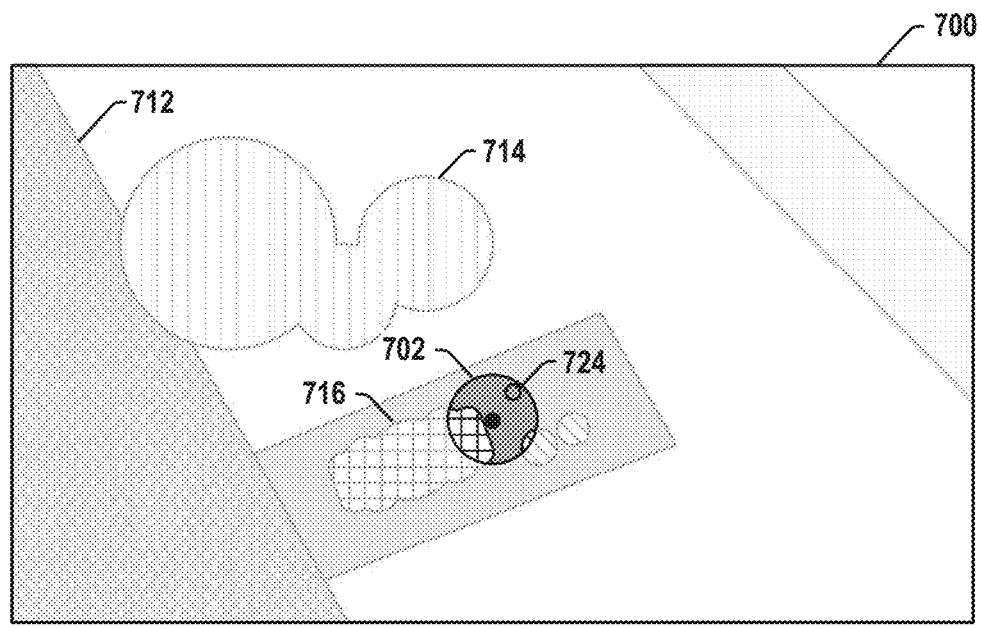

FIG. 7 illustrates an initial delivery point and a nudged delivery point, in accordance with example embodiments.

FIG. 7 depicts segmentation image 700 of the delivery location and segmentation image 700 includes initial delivery point 704. Based on the segmentation image, the UAV may determine a distance-to-obstacle image to facilitate determining a nudged delivery point that may be preferable for delivery of the payload. As mentioned above, the distance-to-obstacle image could include one or more pixels and each pixel could be representative of a distance in the segmentation image from a nearest pixel area with a semantic classification indicative of an obstacle in the delivery location.

For example, the UAV could calculate the distance from initial delivery point 704 to each of the pixel areas with a semantic classification indicative of an obstacle and determine the smallest distance to an obstacle. This distance may be designated as the distance represented by that pixel. For initial delivery point 704, the UAV could calculate a distance from initial delivery point 704 to building pixel area 712, a distance from initial delivery point 704 to tree pixel area 714, and a distance from initial delivery point 704 to vehicle pixel area 716. Determining these distances may involve determining 2D lateral distance measurements. The UAV could compare each of the determined distances, determine that the distance from initial delivery point 704 to vehicle pixel area 716 is the smallest out of all the determined distances, and designate that distance as the distance represented by the pixel at initial delivery point 704 of the distance-to-obstacle image.

In some examples, the UAV may only determine the distance-to-obstacle image for an area within a delivery zone at the delivery location. The delivery zone may be an area of the segmentation image that corresponds to an area in the delivery location within a threshold distance of the delivery point. For example, initial delivery point 704 may be associated with delivery zone 702, which may be an area within two meters of delivery point 704 in all lateral directions. Initial delivery point 704 may thus be necessarily in the center of delivery zone 702. In some examples, the UAV may adjust the delivery zone based on an angle at which the image was captured, e.g., if the UAV captured the image at a 30 degree angle, the UAV may use a delivery zone having an oval shape to account for the 30 degree angle. Determining the distance-to-obstacle image for only a portion of the image may save computation space and time, as an image could have several hundred pixels and several areas indicated to be obstacles. Calculating the distance for each pixel in the image could also be unnecessary, as it may be preferable for the UAV to not deliver the payload too far away from the intended delivery point, e.g., initial delivery point 704.

Although the distance-to-obstacle image may only be determined for initial delivery zone 704, the nearest obstacle of a given pixel in initial delivery zone 704 may be outside initial delivery zone 704. For example, if vehicle pixel area 716 was not in the image, the nearest pixel area for initial delivery point 704 may be tree pixel area 714. The UAV may thus designate for the pixel corresponding to initial delivery point 704 in the distance-to-obstacle image as the distance between initial delivery point 704 and tree pixel area 714.

Based on the distance-to-obstacle image, the UAV may select a delivery point in the delivery zone. For example, based on segmentation image 700, the UAV may select nudged delivery point 724 to deliver the payload. In some examples, the UAV may select the delivery point based on height (e.g., select a delivery point that is the farthest away from the tallest obstacle), based on particular classifications (e.g., select a delivery area that is the farthest away from pixel areas with semantic classification of roads, as payloads could cause accidents or become damaged), and/or based on the delivery point having the largest distance away from any pixel area with a semantic classification indicative of an obstacle.

In further examples, delivery point 724 may also be selected based on a three-dimensional (3D) image of a delivery location. In some such examples, the UAV may input a captured image into a trained machine learning model to obtain the 3D image. The 3D image may include depth measurements, and these depth measurements may be used to select the delivery point. For example, the UAV may select a nudged delivery point based on the delivery point being at least a threshold distance away from the tallest obstacle and/or any obstacles above a certain height.

Selecting the delivery point in the delivery zone may also include determining a first value in a first direction and a second value in a second direction, where the first and second values are representative of the nudged delivery point relative to a current position of the UAV. For example, the UAV may have a current position of initial delivery point 704. The UAV may represent nudged delivery point 724 using a first value in a first direction and a second value in a second direction, e.g., that nudged delivery point 724 is 1.5 meters north and 1.3 meters east of initial delivery point 704 and the current location of the UAV. The UAV may then navigate to the adjusted delivery point based on these values and directions.

In further examples, the UAV may capture a depth image using one or more sensors or determine a depth image based on an image captured by the UAV. The depth image may include depth measurements and the UAV may use the depth image to adjust the horizontal positioning of the UAV from the delivery point during UAV descent. For example, if the UAV detects that it is in proximity to a tall obstacle (e.g., a tree), the UAV may adjust its horizontal position to be further away from the tall obstacle.

In some examples, before determining the distance-to-obstacle image and before selecting a nudged delivery point, the UAV may first determine whether determining a nudged delivery point is necessary. For example, if the initial delivery point is already far enough away from obstacles, it may be unnecessary to determine a nudged delivery point. Therefore, the UAV may first determine that the initial delivery point is less than a threshold distance away from the nearest obstacle (or tallest obstacle, obstacle with a particular classification, or a combination thereof). And in response to determining that the initial delivery point is less than the threshold distance away from the obstacle (e.g., that nudging the delivery point may improve delivery of the payload), the UAV may determine the distance-to-obstacle image to facilitate selecting a nudged delivery point. If the initial delivery point is greater than the threshold distance away from the nearest obstacle, then the UAV may instead select the initial delivery point as the nudged delivery point in the delivery zone.

In some examples, the UAV may determine nudged delivery point 724 using two or more images captured of the delivery location. For example, while hovering over initial delivery point 704, the UAV may periodically capture images of the delivery location. Additionally or alternatively, the UAV may periodically capture images of the delivery location while descending over initial delivery point 704. And based on these two or more captured images of the delivery location, the UAV may determine two or more segmentation images and two or more distance-toobstacle images. The UAV may then use these distance-to-obstacle images as a basis to determine an adjusted delivery point.

Capturing two or more images to be used as a basis for determining a nudged delivery point may be particularly useful in delivery locations with varying activity. For example, if the delivery point is on a sidewalk, capturing two or more images may indicate movement on the sidewalk. Based on detecting movement (e.g., variance in the segmentation images and/or variance in the distance-to-obstacle images), the UAV may determine a nudged delivery point based on the nudged delivery point not being in proximity to the area with the detected movement.

Further, the UAV may capture two or more images to increase confidence in the nudged delivery point and verify that the nudged delivery point is consistently a delivery point at which delivery of the payload may be completed. If the UAV determines the same nudged delivery point or nudged delivery points within a general area over the two or more captured images, the nudged delivery point may be a delivery point where the UAV may confidently deliver the payload.

VIII. Nudge/Un-Nudge Trajectories

Figure 8:
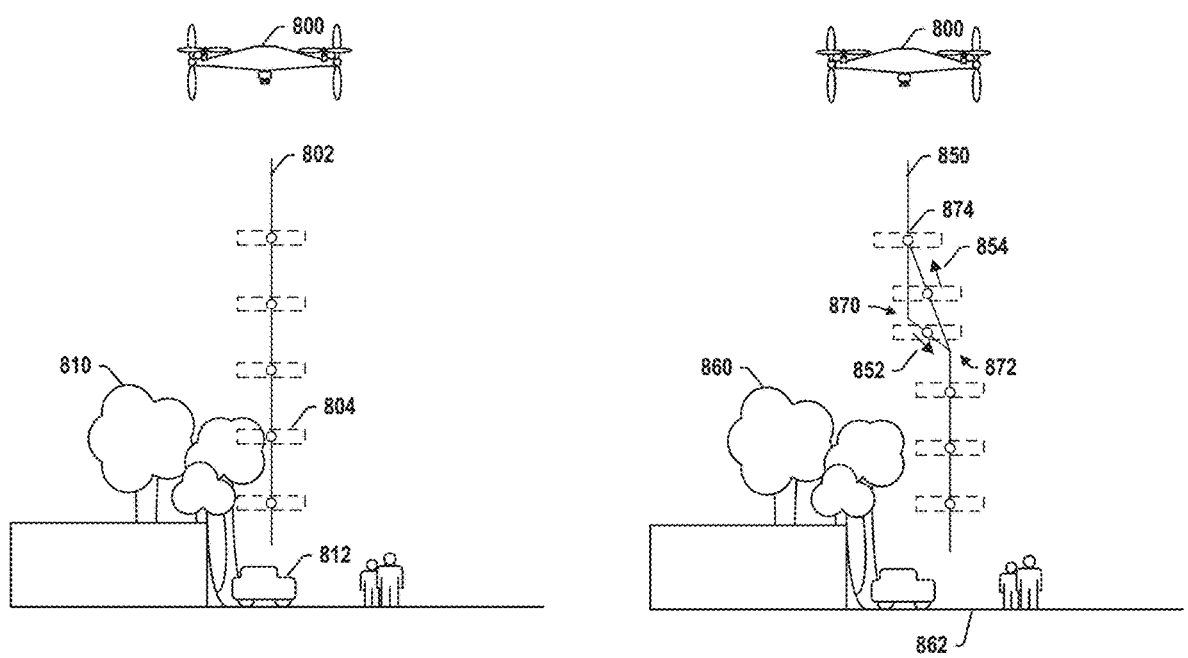
FIG. 8 illustrates an un-nudged trajectory and a nudged trajectory, in accordance with example embodiments.

FIG. 8 illustrates un-nudged trajectory 802 and nudged trajectory 850, in accordance with example embodiments. Un-nudged trajectory 802 may be the trajectory that the UAV follows when the initial delivery point is not nudged. The UAV may navigate to the delivery point and descend straight down to the ground or to a certain altitude above the ground before delivering the payload. However, in some examples, un-nudged trajectory 802 may be in close proximity to one or more obstacles. For example, during its descent, UAV 800 may navigate through un-nudged trajectory point 804, and UAV 800 at un-nudged trajectory point 804 may be hazardously close to trees 810. Further, if the UAV descends through un-nudged trajectory 804 to deliver the payload at the delivery point, the payload may be delivered onto vehicle 812, which may not be an optimal location for delivery of a payload.

Nudged trajectory 850 may be a more optimal trajectory to navigate the UAV for delivery of the payload. Nudged trajectory 850 may be determined using the process disclosed above. Namely, UAV 800 may navigate to be above an initial delivery point and descend to a certain altitude before capturing one or more images to determine a nudged delivery point. Nudged trajectory 850 may include descending trajectory 852 and ascending trajectory 854.

The UAV may follow descending trajectory 852 to deliver the payload and the UAV may follow ascending trajectory 854 to return to a higher altitude after delivery of the payload. To avoid collisions into obstacles, ascending trajectory 854 may traverse an area higher in altitude than descending trajectory 852.

For example, descending trajectory 852 may start at first point 870 at a first altitude over the initial delivery point. UAV 800 may then descend to second point 872 at a second altitude over the nudged delivery point. Second point 872 may be at a lower altitude than the first altitude. UAV 800 may then descend further over the nudged delivery point to deliver the payload. With nudged trajectory 850, UAV 800 may no longer travel as close to trees 860 as in un-nudged trajectory 802. UAV 800 may also be able to deliver the payload over ground 862 rather than over vehicle 812. After having delivered the payload, UAV 800 may ascend back to second point 872. At second point 872, UAV 800 may navigate through ascending trajectory 854 to arrive at third point 874. Third point 874 may be positioned over the initial delivery point and may be at a higher altitude than second point 872. In some examples such as illustrated in FIG. 8, third point 874 may also be at a higher altitude than first point 870.

Ascending trajectory 854 may be followed by UAV 800 to navigate from above the nudged delivery point to above the initial delivery point may be a different trajectory from the initially followed descending trajectory. These different trajectories may facilitate solving a potential problem where the UAV might collide with an obstacle while ascending. For example, UAV 800 could follow a descending trajectory that narrowly avoids a tree. If UAV 800 follows the same trajectory to ascend, the UAV could potentially collide with the tree if there are any inaccuracies or extraneous factors. Therefore, it could be advantageous for the ascending trajectory to traverse an area different from (e.g., above) descending trajectory 852.

Figure 9:
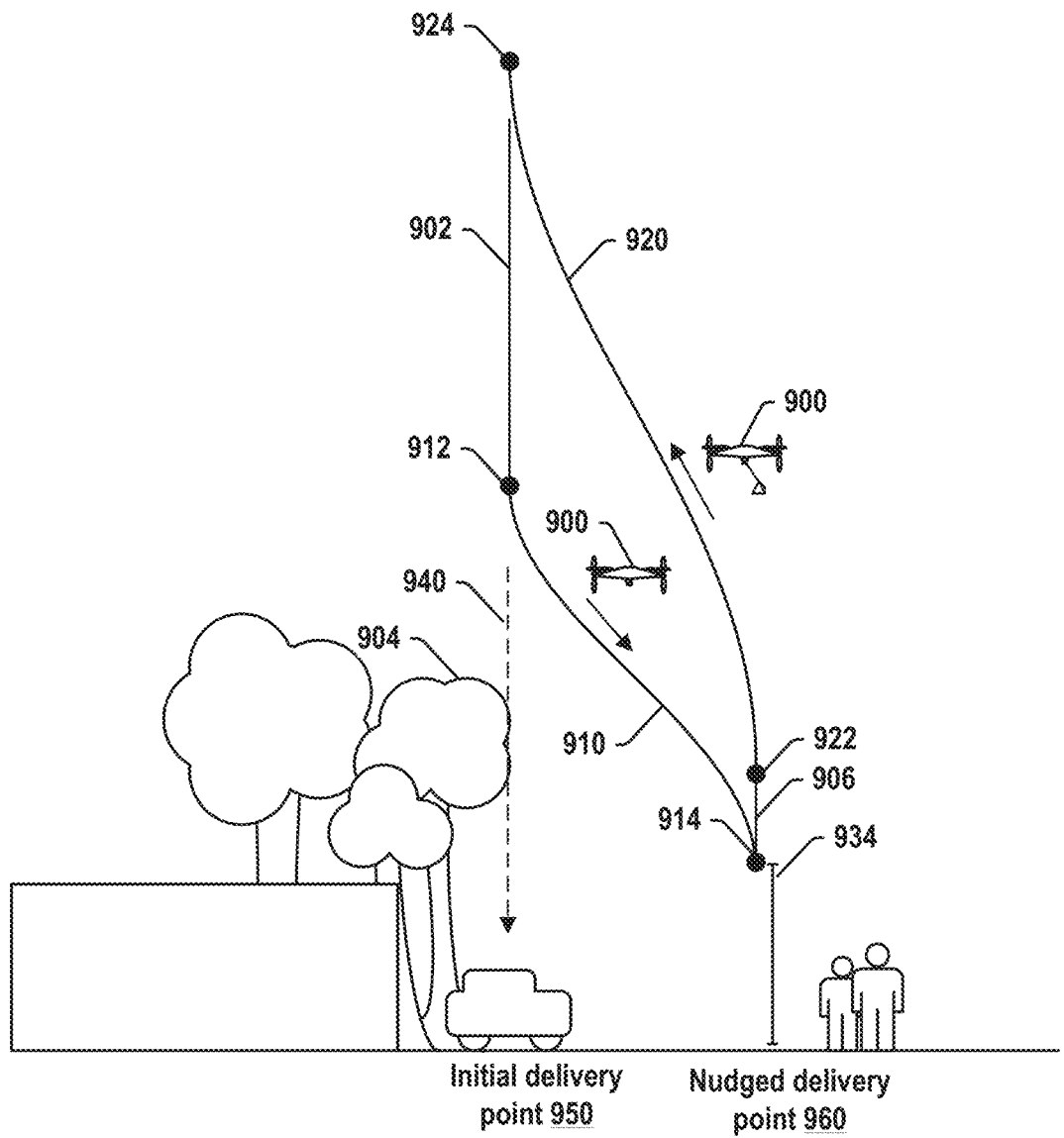
FIG. 9 illustrates a descending trajectory and an ascending trajectory, in accordance with example embodiments.

FIG. 9 illustrates descending trajectory 910 and an ascending trajectory 920, in accordance with example embodiments. Descending trajectory 910 starts at first point 912 and ends at second point 914, and ascending trajectory 920 starts at third point 922 and ends at fourth point 924. The UAV may determine descending trajectory 910 and ascending trajectory 920 based on the likelihood of colliding into various obstacles. Descending trajectory 910 may include a horizontal descending speed and a vertical descending speed, and ascending trajectory 920 may include a horizontal ascending speed and a vertical ascending speed.

Each of first point 912 and second point 914 of descending trajectory 910, and each of third point 922 and fourth point 924 of ascending trajectory 920 may be at various altitudes in the environment to decrease the likelihood of colliding into various objects. In some examples, altitudes may be measured based on the distance of the point to ground level. For example, third point 914 may be at altitude 934.

As mentioned above, UAV 900 may navigate to first point 912 at a first altitude above initial delivery point 950 at the delivery location. Navigating to first point 912 may involve navigating UAV 900 from a take off location (e.g., from a warehouse, a central location of UAVs, a previous delivery location, etc.), positioning the UAV to be over initial delivery point 950, and descending over initial delivery point 950, e.g., through trajectory 902, to be at the first altitude.

After navigating to first point 912, UAV 900 may determine nudged delivery point 934, perhaps in response to determining that initial delivery point 950 is obstructed by an obstacle or otherwise no longer a favorable location to deliver the payload. To determine nudged delivery point 934, the UAV may capture one or more images of the delivery location while hovering over initial delivery point 950 or during the descent to the first altitude over initial delivery point 950. The UAV may determine nudged delivery point 960 based on the captured image, perhaps using the method discussed above of determining a segmentation image and a distance-to-obstacle image of the delivery zone. Other methods of determining an alternative delivery point may also be used.

Based on nudged delivery point 960, UAV 900 may navigate through a descending trajectory to move the UAV from first point 912 to second point 914. Second point 914 may be at a second altitude over nudged delivery point 960 and may be at a lower altitude than first point 912. Descending while navigating to nudged delivery point 960 may result in faster completion of the delivery task while also avoiding collisions with obstacles.

At second point 914, UAV 900 may deliver the payload or descend further over nudged delivery point 960 to deliver the payload. More specifically, UAV 900 may hover over nudged delivery point 960 and extend a tether to or near to the ground to deliver the payload. Alternatively, UAV 900 may descend further over nudged delivery point 960 before extending the tether to deliver the payload. In some examples, UAV 900 may also extend the tether during descending trajectory 910.

After having delivered the payload, UAV 900 may ascend through trajectory 906 to arrive at third point 922. Third point 922 may be at a third altitude above nudged delivery point 960. In some examples, UAV 900 may at least partially retract the tether while ascending through trajectory 906.

After arriving at third point 922, UAV 900 may traverse ascending trajectory 920 starting from third point 922 and ending at fourth point 924. Fourth point 924 may be at a fourth altitude above initial delivery point 950, and fourth point 924 may be at a higher altitude than third point 922. Navigating to be above the initial delivery point before departing from the delivery location may decrease the chances that UAV 900 collides with an obstacle. Because UAV 900 may not have and/or use a sensor that captures the environment above UAV 900, an obstacle may potentially be above nudged delivery point 960 and UAV 900 may not be able to detect the presence of such an obstacle. For example, UAV 900 may determine nudged delivery point 960 after having navigated to a height that is below an overhang of a building. UAV 900 may therefore neglect to take the overhang into account when determining nudged delivery point 960 and determine a nudged delivery point 960 that is underneath the overhang. If UAV 900 does not navigate back to initial delivery point 950, UAV 900 may collide with the overhang. Therefore, navigating from third point 922 above nudged delivery point 960 to fourth point 924 above initial delivery point 950 may result in more successful UAV deliveries by decreasing the chances of colliding with undetected obstacles from above.

In some examples, the tether of UAV 900 may be at least partially extended during at least part of ascending trajectory 920, and UAV 900 may retract the tether while navigating ascending trajectory 920. As mentioned above, retracting the tether while the UAV departs from the delivery location may reduce the total amount of time the UAV takes to deliver an item, but the tether might swing uncontrollably, which may cause collisions with various obstacles. Therefore, in order to avoid obstacles, the UAV could navigate through ascending trajectory 920 at a slower horizontal speed than descending trajectory 910, particularly in instances where the tether of UAV 900 is partially extended during at least part of the ascending trajectory.

Further, variations of the altitudes of first point 912, second point 914, third point 922, and fourth point 924 are also possible. For example, fourth point 924 may be at a fourth altitude, and this fourth altitude may be higher than the first altitude of first point 912 of the descending trajectory, as shown in FIG. 9. Having fourth point 924 be at a higher altitude than first point 912 may facilitate avoidance of obstacles within close proximity to first point 912. And having fourth point 924 at a higher altitude than first point 912 may be particularly useful when UAV determines that there is an obstacle in close proximity to first point 912, perhaps based on the image of the delivery location captured to determine nudged delivery point 960 or other sensor data capturing the height of each element in the delivery location.

In some examples, second point 914 of descending trajectory 910 may be at the same altitude as third point 922 of ascending trajectory 920. This trajectory is shown in FIG. 8, where second point 914 and third point 922 are roughly equivalent points, as both points are above the nudged delivery point and at the same altitude. UAV 900 may thus ascend to the same point where it finished descending after delivering the payload. Having second point 914 be at the same altitude of third point 922 may facilitate minimizing collisions particularly in environments with overhangs, and particularly in instances where nudged delivery point 960 is close to a low overhang. Because UAV 900 does not navigate above a certain altitude at nudged delivery point 960, UAV 900 may avoid any obstacles that are over nudged delivery point 960.

Further, third point 922 of ascending trajectory 920 may be at a higher altitude than first point 912 of descending trajectory 910. In other words, after delivering the payload, UAV 900 may ascend over the nudged delivery point to an altitude higher than that of first point 912 before traversing the ascending trajectory. Having third point 922 be at a higher altitude than first point 912 may facilitate avoidance of obstacles within close proximity to descending trajectory 910, such as trees 904.

In some examples, first point 912 may have an equal altitude to fourth point 924 of ascending trajectory 920. In other words, UAV 900 may start traversing descending trajectory 910 at the same position and altitude as it finishes traversing ascending trajectory 920. Having fourth point 926 be at the same altitude and position as first point 912 may facilitate avoidance of obstacles, particularly in environments with low overhangs. For example, if an overhang is over nudged delivery point 960 at the same altitude as first point 912, having fourth point 924 be at the same altitude as first point 912 may help avoid that obstacle.

In some examples, third point 922 may have a higher altitude than second point 914. In other words, after delivering the payload, UAV 900 may ascend over the nudged delivery point to an altitude higher than that of second point 914 before traversing the ascending trajectory. Having third point 922 being at the same altitude and position as second point 914 may facilitate avoidance of obstacles, particularly in environments where nudged delivery point 960 and/or descending trajectory 910 is in proximity to a tall obstacle.

Further, as mentioned above, initial delivery point 950 and nudged delivery point 960 may be at least a predefined distance apart. If initial delivery point 950 and nudged delivery point 960 are more than a predefined distance apart, the nudged delivery point may be too far away from the desired delivery location to be useful. In some examples, it might also be useful if initial delivery point 950 and nudged delivery point 960 are greater than a threshold distance apart. More specifically, if initial delivery point 950 and nudged delivery point 960 are less than a predefined distance apart, nudging might not be necessary for delivery of the payload.

In some examples, the UAV may determine that initial delivery point 950 is an undeliverable delivery point to which the payload cannot be successfully delivered and that nudged delivery point 960 is a deliverable delivery point to which the payload can be successfully delivered. For example, in FIG. 9, if UAV 900 were to directly descend to initial delivery point 950 through following trajectory 940, UAV 900 may either collide with trees 904 or with a vehicle over initial delivery point 950. However, by nudging the delivery point to nudged delivery point 960, UAV 900 may successfully deliver the payload onto the ground.

Further, initial delivery point 950 may be a predefined delivery point. For example, a computing system (e.g., a server) may store and/or determine the initial delivery point 950 and may send initial delivery point 950 to UAV 900 in response to receiving a request from UAV 900 for a delivery point at the delivery location. Additionally or alternatively, UAV 900 may store initial delivery point 950 as a predefined delivery point and retrieve the predefined delivery point from memory when tasked with delivering the payload to the delivery location.

Additionally or alternatively, one or more altitudes of first point 912, second point 914, third point 922, and fourth point 924 may be one or more predefined altitudes. For example, the first altitude of first point 912 may be a predefined altitude (e.g., 25 meters above the surface of the delivery location and/or the ground), and UAV 900 may retrieve the first altitude from memory of UAV 900 or from the memory of another computing device (e.g., a server). In particular, UAV 900 may send a request to a computing device for the first altitude at the delivery location, and receive a response from the computing device specifying the first altitude.

In some examples, determining initial delivery point 950 may be based on an image of the delivery location. For example, UAV 900 may use historical data to determine an image of the delivery location and/or retrieve a captured image of the delivery location from memory. And UAV 900 may determine initial delivery point 950 based on this determined and/or retrieved image of the delivery location As discussed above, determining nudged delivery point 960 may also be based on an image captured of the delivery location. For example, UAV 900 may include a downward facing camera. UAV 900 may navigate to be above initial delivery point 950 and may use the downward facing camera to capture an image of the delivery location. Based on the captured image, UAV 900 may determine a segmentation image and a distance-to-obstacle image based on the segmentation image. The segmentation image may be determined based on applying a pre-trained machine learning model to at least part of the captured image of the delivery location. Based on the distance-to-obstacle image, UAV 900 may determine nudged delivery point 960 to be the farthest away from obstacles and/or where delivery of the payload has the highest chance of succeeding.

IX. Semantic Abort

In some examples, the area around a delivery point may be too full of obstacles to safely and confidently deliver the payload within a reasonable distance of the intended delivery point. Therefore, the UAV could evaluate one or more delivery points to determine whether to deliver the payload or to abort delivery of the payload. In some examples, if the UAV chooses to abort delivery of the payload, the UAV may return to the delivery location at another time to evaluate the delivery point, perhaps when the activity in the delivery location is predicted to be lower based on historical data.

To evaluate one or more delivery points to determine whether to deliver the payload or whether to abort delivery of the payload, the UAV may determine a segmentation image using the method discussed above. More specifically, the UAV may capture an image of the delivery location using a sensor, e.g., the UAV may capture captured image 600 of FIG. 6, and perhaps after descending to a predefined altitude (e.g., at a first altitude corresponding to first point 912 of FIG. 9). In some examples, the UAV may capture the image of the delivery location using a downward facing sensor, e.g., a camera. The captured image may be representative of the delivery location below the UAV. And based on captured image 600, the UAV may determine a segmentation image that segments the image of the delivery location into a plurality of pixel areas with corresponding semantic classifications. In some examples, the UAV may select the semantic classifications from a predetermined set of semantic classifications, including at least semantic classifications corresponding to vegetation, buildings, and roads.

Figure 10:
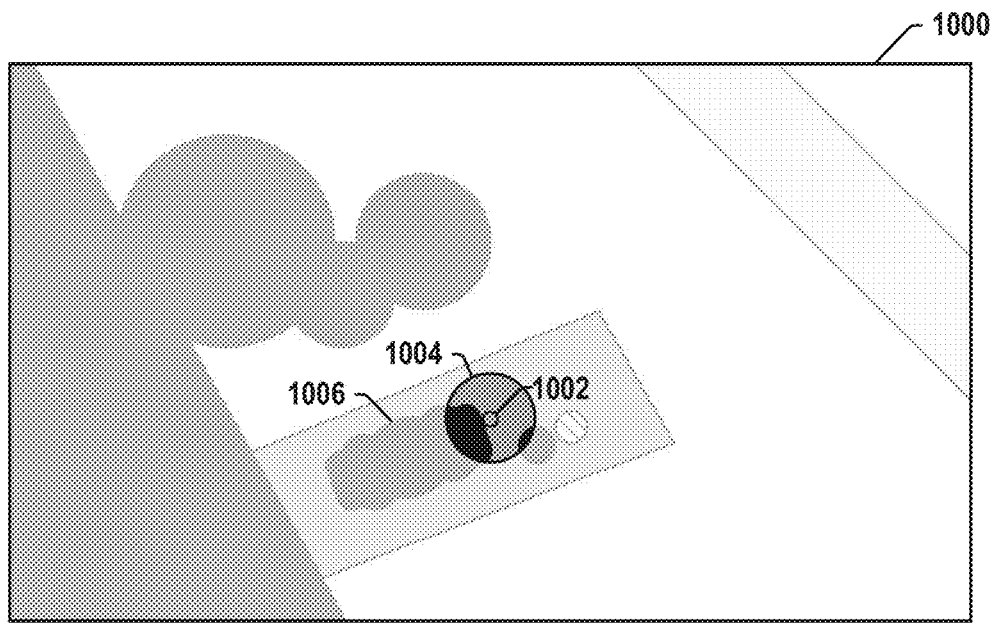
FIG. 10 illustrates images of obstacle pixel areas, in accordance with example embodiments.
Figure 10:
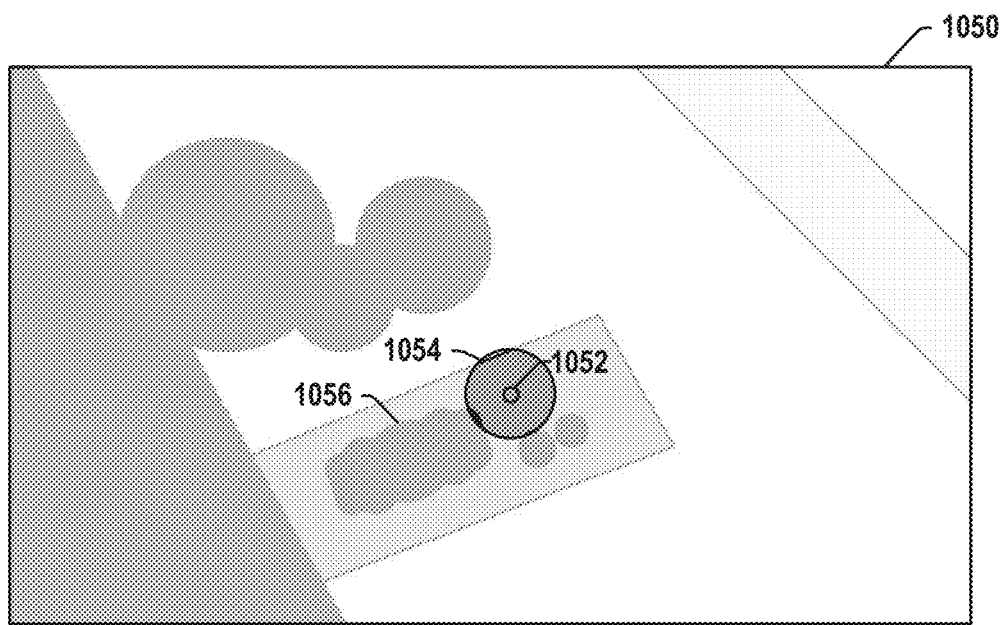

Based on the segmentation image, the UAV may determine a percentage of obstacle pixels within a surrounding area of a delivery point at a delivery location, where each obstacle pixel has a semantic classification indicative of an obstacle in the delivery location. As an illustration, FIG. 10 depicts image 1000 and image 1050 illustrating obstacle pixel areas, in accordance with example embodiments. Image 1000 contains initial delivery point 1002. Surrounding area 1004 is an area within a certain distance of delivery point 1002 (e.g., 2 meters). Further, image 1050 contains nudged delivery point 1052. Surrounding area 1054 is an area within a certain distance of delivery point 1052 (e.g., 2 meters).

To determine whether a payload may safely be delivered to initial delivery point 1002 and/or to nudged delivery point 1052, the UAV may determine a percentage of obstacle pixels within each surrounding area. The UAV may designate particular semantic classifications of pixel areas as obstacles. For example, pixel areas designated as vehicles, vegetation, buildings, residences, and related designations, among others, may be deemed as obstacles. Whereas, pixel areas designated to be sidewalks, driveways, other related designations, etc. may be deemed as not obstacles.

Therefore, regarding initial delivery point 1002 and surrounding area 1004, the UAV may determine that area 1006 among other areas in image 1000 are obstacles and determine that 40% of the pixels within surrounding area 1004 of initial delivery point 1002 are obstacle pixels. More specifically, to determine the percentage of obstacle pixels, the UAV may determine within surrounding area 1004 the number of pixels corresponding with a pixel area with a semantic classification indicating an obstacle, e.g., area 1006. The UAV may divide this number of pixels corresponding with a pixel area with the total number of pixels within surrounding area 1004 to obtain the percentage of obstacle pixels within surrounding area 1004 of delivery point 1002.

To determine whether delivery at initial delivery point 1002 should be aborted, the UAV may compare the percentage of obstacle pixels within surrounding area 1004 to a threshold percentage. For example, if the threshold percentage is 30%, the UAV may determine that the percentage of obstacle pixels within surrounding area 1004 (e.g., determined to be 40%) exceeds the threshold percentage of 30%. Based on this determination that the percentage of obstacle pixels is above a threshold percentage, the UAV may abort delivery of the payload to delivery point 1002. In some examples, the UAV may try to deliver the payload at a later time, perhaps when surrounding area 1004 contains less obstacles.

Similar methods may be applied to other delivery points to evaluate whether the surrounding area is safe to deliver a payload. For example, regarding nudged delivery point 1052 and surrounding area 1054, the UAV may determine that area 1056 among other areas in image 1050 are obstacles. Based on this determination, the UAV may calculate that 5% of the pixels within surrounding area 1054 are obstacle pixels. The UAV may then compare the percentage of obstacle pixels within surrounding area 1054 around nudged delivery point 1052 with the threshold percentage of 30%. And the UAV may determine that the percentage of obstacle pixels within surrounding area 1054 of 5% does not exceed the threshold percentage of 30%, and the UAV may determine to continue with the process of delivering the payload.

In some examples, the UAV may use this evaluation of an area surrounding a delivery point to determine whether to nudge the delivery point or whether to abort delivery of the payload. For example, if the threshold percentage is 60%, then the UAV may determine that the percentage of obstacle pixels within surrounding area 1004 does not exceed the threshold percentage, and the UAV may determine nudged delivery point 1052 as the point at which to deliver the payload.

Further, the UAV may use this evaluation of an area surrounding a delivery point to determine whether the UAV determined an appropriate nudged delivery point. For example, the UAV may calculate the percentage of obstacle pixels within surrounding area 1054 to evaluate whether nudged delivery point 1052 is a delivery point where delivery of the payload may be completed successfully. If the percentage of obstacle pixels within surrounding area 1054 exceeds the threshold percentage, the UAV may abort delivery of the payload or revert to the previous delivery point, e.g., delivery point 1002.

In some examples, the delivery point at the delivery location may be determined by a delivery point selection module (e.g., the process to determine a nudged delivery point discussed above). Further, determining to abort delivery may be based on an image taken above the intended delivery point. Therefore, aborting delivery of the payload (or not aborting delivery of the payload) may be done after determining the delivery point and after navigating to the delivery point.

Further, this process of determining a nudged delivery point may be based on the distance of the initial delivery point from an obstacle. More specifically, determining a delivery point at the delivery location may include determining that the initial delivery point is within a threshold distance of an obstacle. The process of determining the delivery point at the delivery location may further include selecting a nudged delivery point that is at least the threshold distance away from the initial delivery point, perhaps in response determining that the initial delivery point is within the threshold distance of an obstacle.

The UAV may carry out this process of determining whether to abort the delivery process of the UAV as part of a descent process of the UAV and aborting the delivery process may be aborting the descent process of the UAV. More specifically, the UAV may be in the process of descending over a delivery point while it carries out this process of evaluating whether to abort the delivery process. If the UAV determines that the percentage of obstacle pixels exceeds a threshold percentage, the UAV may stop descending and abort the descent process.

In some examples, the evaluation of determining whether to abort the delivery process may be based on multiple images of the delivery location, perhaps taken during descent of the UAV and perhaps periodically during the descent process or during the navigation of the UAV at the delivery point. The UAV may determine a segmentation image for each of the multiple images, and the UAV may determine whether to abort delivery of the payload based on the multiple segmentation images.

For example, the UAV may determine multiple percentages of obstacle pixels within a surrounding area of a delivery point, and the UAV may determine a total count of the multiple percentages of additional obstacle pixels being above a threshold percentage. And based on the total count being greater than a threshold count, the UAV may determine to abort delivery of the payload. As a more specific example, the UAV may take three images of the delivery location, and the UAV may determine that the percentage of obstacle pixels is 75%, 60%, and 30% respectively. The total count of the percentages of obstacle pixels being above a threshold percentage of 50% is two. The threshold count may be one. Since the total count of two is greater than the threshold count of one, the UAV may abort delivery of the payload.

Other methods of determining whether to abort delivery of the payload based on multiple segmentation images are also possible. For example, the UAV may determine percentages of obstacle pixels for each of the multiple segmentation images and the UAV may determine an average of these determined percentages. Based on the average percentage being greater than a threshold average percentage, the UAV may abort the delivery process of the UAV. As another example, the UAV may also determine an uncertainty measure based on the percentages of obstacle pixels of each of the multiple images. The uncertainty metric may be a statistical measure of uncertainty, such as the standard deviation of the determined percentages of obstacle pixels. Aborting the delivery process may be based on the uncertainty metric being greater than a threshold uncertainty measure.

In some examples, the UAV may capture a tilted image of the delivery location, and the UAV may determine the percentage of obstacle pixels within the surrounding area of the delivery point at the delivery location based on the tilted image of the delivery location. For example, if the UAV captured the image at a 30 degree angle, the UAV may adjust the surrounding area of the delivery point to be oval-shaped to account for the 30 degree angle, and the UAV may determine the percentage of obstacle pixels within that surrounding area of the delivery point.

Further, the image of the delivery location might be a 2D image, and the UAV may determine a 3D image from the 2D image using the process discussed above. Determining the percentage of obstacle pixels within the surrounding area of the delivery point may be based on the segmentation image as well as the 3D image, in conjunction or separately.

Additionally or alternatively, the UAV may include a depth sensor, and the UAV may capture a depth image of the delivery location using the depth sensor. Determining the percentage of obstacle pixels within the surrounding area of the delivery point at the delivery location may be further based on the depth image. For example, pixel areas with semantic classifications indicative of an obstacle may be ignored if the pixel areas are below a certain height.

In some examples, the delivery process may be to deliver a payload with one or more dimensions, and the threshold percentage may be based on the one or more dimensions of the payload. For example, if the dimensions of the payload are large, the UAV may determine a lower threshold percentage so that less obstacles are needed to be in the surrounding area of the delivery point in order to trigger aborting the delivery process. If the dimensions of the payload are small, the UAV may determine a higher threshold percentage so that more obstacles are needed to be in the surrounding area of the delivery point in order to trigger aborting the delivery process.

X. Example Methods

Figure 11:
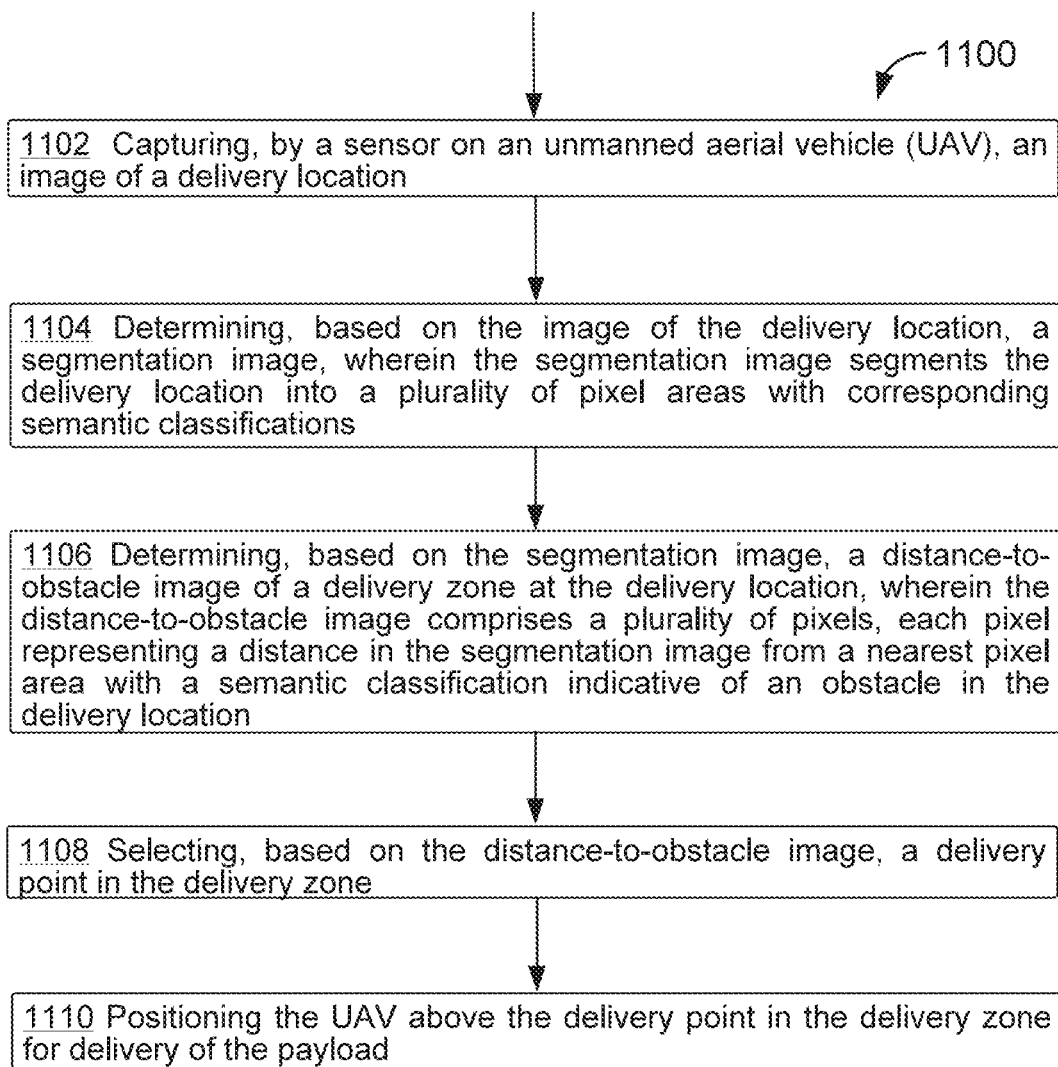
FIG. 11 is a block diagram of a method, in accordance with example embodiments.
Figure 12:
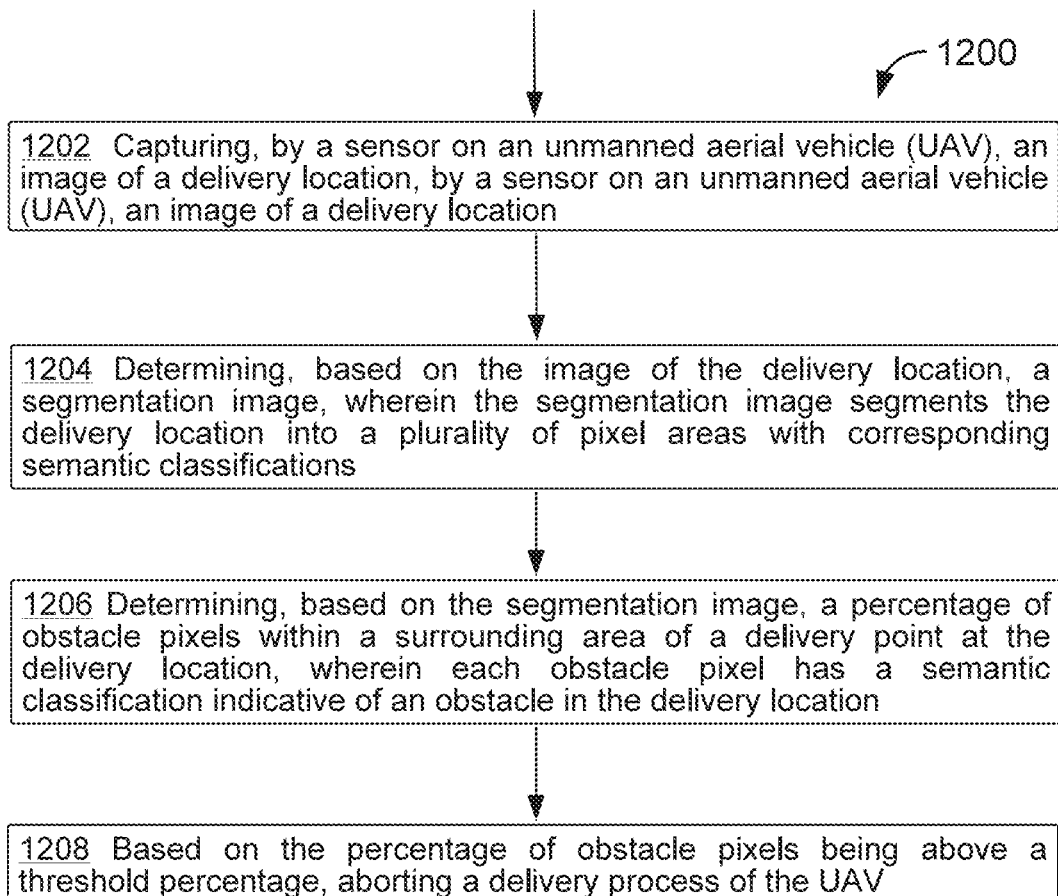
FIG. 12 is a block diagram of a method, in accordance with example embodiments.
Figure 13:
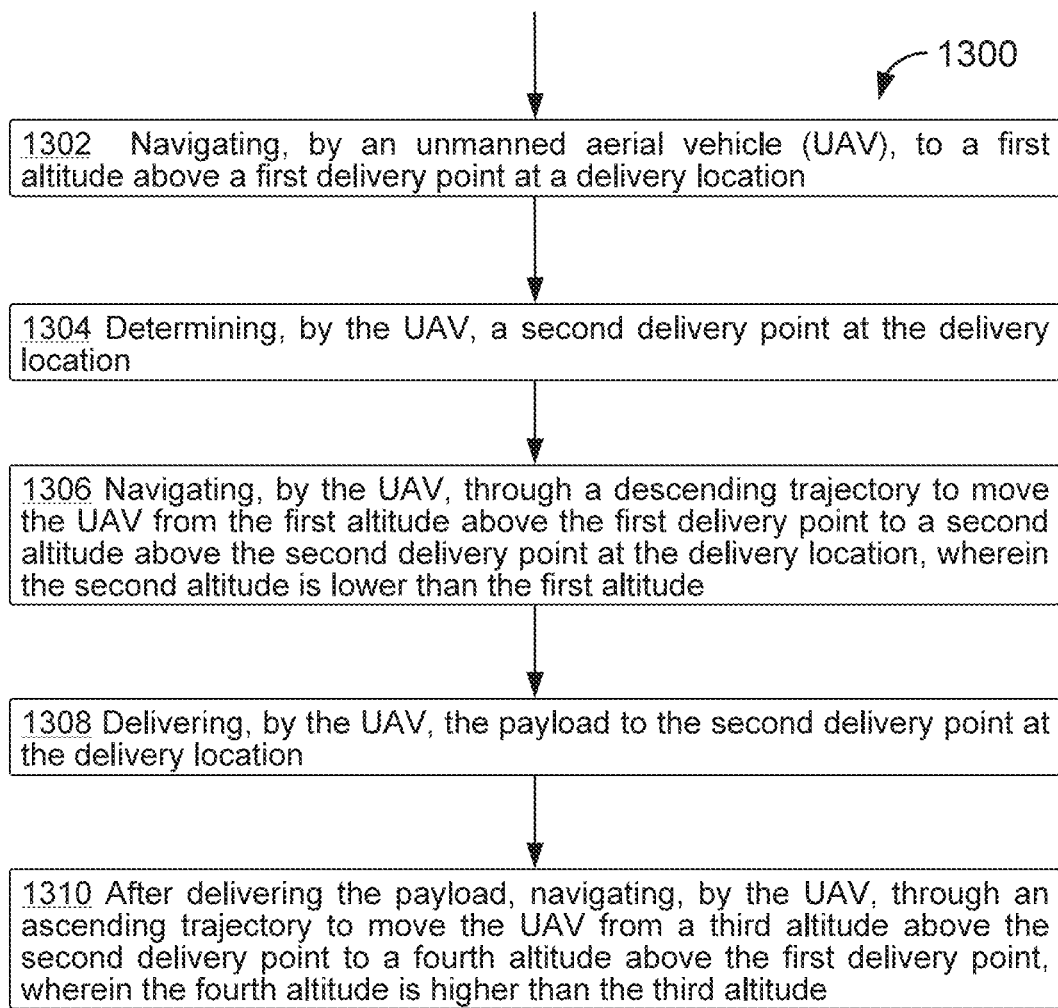
FIG. 13 is a block diagram of a method, in accordance with example embodiments.

FIGS. 11, 12, and 13 are block diagrams of methods 1100, 1200, and 1300, respectively, in accordance with example embodiments. In some examples, any or all of methods 1100, 1200, and 1300 of FIGS. 11, 12, and 13 respectively may be carried out by a control system. In further examples, methods 1100, 1200, and 1300 may be carried out by one or more processors, executing program instructions stored in a data storage. Execution of methods 1100, 1200, and 1300 may involve a UAV, such as the UAV illustrated and described with respect to FIGS. 1-2. Other UAVs may also be used in the performance of methods 1100, 1200, and 1300. In further examples, some or all of the blocks of methods 1100, 1200, and 1300 may be performed by a control system remote from the UAV. In yet further examples, different blocks of methods 1100, 1200, and 1300 may be performed by different control systems, located on and/or remote from a UAV.

As mentioned, FIG. 11 is a block diagram of method 1100, in accordance with example embodiments.

At block 1102, method 1100 includes capturing, by a sensor on an unmanned aerial vehicle (UAV), an image of a delivery location.

At block 1104, method 1100 includes determining, based on the image of the delivery location, a segmentation image, where the segmentation image segments the delivery location into a plurality of pixel areas with corresponding semantic classifications.

At block 1106, method 1100 includes determining, based on the segmentation image, a distance-to-obstacle image of a delivery zone at the delivery location, where the distance-to-obstacle image comprises a plurality of pixels, each pixel representing a distance in the segmentation image from a nearest pixel area with a semantic classification indicative of an obstacle in the delivery location.

At block 1108, method 1100 includes selecting, based on the distance-to-obstacle image, a delivery point in the delivery zone.

At block 1110, method 1100 includes positioning the UAV above the delivery point in the delivery zone for delivery of a payload.

In some examples, the delivery point is a second delivery point, and method 1100 further comprises navigating, by the UAV, above a first delivery point in the delivery zone, and after navigating above the first delivery point, descending to an altitude above the first delivery point, where positioning the UAV above the second delivery point in the delivery zone is performed after descending to the altitude above the first delivery point.

In some examples, the delivery point is a second delivery point, where the delivery zone is a surrounding area around a first delivery point at the delivery location.

Further, method 1100 could further comprise determining a first distance from the first delivery point to a first nearest pixel area, and determining that the first distance is lower than a threshold value, where determining the distance-to-obstacle image of the delivery zone at the delivery location is in response to the determination that the first distance is lower than the threshold value.

In some examples, selecting the delivery point in the delivery zone includes determining, based on the distance-to-obstacle image of the delivery zone at the delivery location, a respective distance between a center delivery point of the delivery zone and a respective nearest pixel area with a semantic classification indicative of an obstacle in the delivery location. Selecting the delivery point in the delivery zone further comprises determining that the respective distance is greater than a threshold distance and in response to determining that the respective distance is greater than the threshold distance, selecting the center delivery point as the delivery point in the delivery zone.

In some examples, determining the distance-to-obstacle image of the delivery zone at the delivery location comprises for a pixel of the delivery zone, determining a corresponding nearest pixel area with a semantic classification indicative of an obstacle for the pixel of the delivery zone, where the corresponding nearest pixel area is outside the delivery zone.

In some examples, the image of the delivery location is a 2D image, where method 1100 further comprises determining, based on the 2D image, a 3D depth image of the delivery location, where selecting the delivery point is further based on the 3D depth image.

In some examples, selecting the delivery point in the delivery zone is based on the delivery point having a farthest distance from any obstacle determined from the segmentation image. Additionally or alternatively, selecting the delivery point in the delivery zone is based on the delivery point having a farthest distance from a tallest obstacle determined from the segmentation image. Still additionally or alternatively, selecting the delivery point in the delivery zone is based on the delivery point having a farthest distance from obstacles with a particular classification determined from the segmentation image.

In some examples, the image of the delivery location is a 2D image, where determining the segmentation image is based on applying a pre-trained machine learning model to the image.

In some examples, determining the distance-to-obstacle image of the delivery zone at the delivery location comprises determining a 2D lateral distance measurement.

Further, in some examples, determining the distance-to-obstacle image of the delivery zone comprises, for each respective pixel of the segmentation image within the delivery zone, determining a set of distances between the respective pixel of the delivery zone and one or more pixel areas with a semantic classification indicative of an obstacle in the delivery location, selecting a lowest distance value from the set of distances, and setting a respective distance at the respective pixel to be the lowest distance value.

In some examples, method 1100 further includes capturing one or more additional images of the delivery location and determining, based on the one or more additional images of the delivery location, one or more additional segmentation images. Method 1100 also includes determining, based on the one or more additional segmentation images, one or more additional distance-to-obstacle images of the delivery zone at the delivery location and selecting, based on the one or more additional distance-to-obstacle images, one or more additional delivery points in the delivery zone. Method 1100 further includes determining that the delivery point and the one or more additional delivery points are within a particular area surrounding the delivery point, where positioning the UAV above the delivery point is in response to determining that the delivery point and the one or more additional delivery points are within the particular area surrounding the delivery point.

In some examples, method 1100 includes capturing one or more additional images of the delivery location and determining, based on the one or more additional images of the delivery location, one or more additional segmentation images. Method 1100 also includes determining, based on the one or more additional segmentation images, one or more additional distance-to-obstacle images of the delivery zone at the delivery location and selecting, based on the one or more additional distance-to-obstacle images, one or more additional delivery points in the delivery zone. Further, method 1100 also includes determining that the delivery point and the one or more additional delivery points are not within a particular area surrounding the delivery point and in response to determining that the delivery point and the one or more additional delivery points are not within a particular area surrounding the delivery point, aborting the delivery of the payload.

In some examples, selecting the delivery point in the delivery zone comprises determining a first value in a first direction and a second value in a second direction relative to the UAV, where the first value in the first direction and the second value in the second direction are representative of the delivery point relative to a current position of the UAV.

In some examples, the UAV further comprises a depth sensor, where method 1100 further includes capturing a depth image of the delivery location, and adjusting horizontal positioning of the UAV from the delivery point during UAV descent based on the depth image.

In some examples, the sensor is a camera, where the camera faces downward, and where the image captured by the camera is representative of the location below the UAV.

As mentioned, FIG. 12 is a block diagram of method 1200, in accordance with example embodiments.

At block 1202, method 1200 includes navigating, by an unmanned aerial vehicle (UAV), to a first altitude above a first delivery point at a delivery location.

At block 1204, method 1200 includes determining, by the UAV, a second delivery point at the delivery location.

At block 1206, method 1200 includes navigating, by the UAV, through a descending trajectory to move the UAV from the first altitude above the first delivery point to a second altitude above the second delivery point at the delivery location, where the second altitude is lower than the first altitude.

At block 1208, method 1200 includes delivering, by the UAV, a payload to the second delivery point at the delivery location.

At block 1210, method 1200 includes, after delivering the payload, navigating, by the UAV, through an ascending trajectory to move the UAV from a third altitude above the second delivery point to a fourth altitude above the first delivery point, where the fourth altitude is higher than the third altitude.

In some examples, the descending trajectory comprises a horizontal descending speed and a vertical descending speed, the ascending trajectory comprises a horizontal ascending speed and a vertical ascending speed, and the horizontal descending speed is greater than the horizontal ascending speed.

In some examples, the UAV includes a tether, and the tether is at least partially extended during at least part of the ascending trajectory.

In some examples, method 1200 includes after delivering the payload and before navigating through the ascending trajectory, ascending, by the UAV, to the third altitude.

In some examples, the fourth altitude of the ascending trajectory is higher than the first altitude of the descending trajectory. Additionally or alternatively, the second altitude of the descending trajectory is equal to the third altitude of the ascending trajectory. Further additionally or alternatively, the third altitude of the ascending trajectory is higher than the first altitude of the descending trajectory. Still additionally or alternatively, the first altitude of the descending trajectory is equal to the fourth altitude of the ascending trajectory. Additionally or alternatively, the third altitude is higher than the second altitude.

In some examples, the first and second delivery points are at least a predefined distance apart.

Further, in some examples, the first delivery point is determined to be an undeliverable delivery point to which the payload cannot be successfully delivered, and the second delivery point is determined to be a deliverable delivery point to which the payload can be successfully delivered.

In some examples, method 1200 includes accessing, from memory, a predefined delivery point for the delivery location, where the predefined delivery point is the first delivery point.

In some examples, method 1200 includes accessing, from memory, at least one predefined altitude, where the at least one predefined altitude is at least one of the first altitude, the second altitude, the third altitude, or the fourth altitude.

In some examples, method 1200 includes capturing an image of the delivery location and determining the first delivery point at the delivery location based on the image of the delivery location.

In some examples, method 1200 includes capturing an image of the delivery location, where determining the second delivery point at the delivery location is based on the image at the delivery location.

In some examples, determining the second delivery point comprises applying a machine learning model to at least a partial image of the delivery location.

In some examples, the UAV further comprises a tether for delivery of the payload, where method 1200 further includes causing the UAV to navigate through at least a portion of the ascending trajectory while the tether is at least partially extended.

In some examples, the UAV further comprises a downward facing camera, where method 1200 further includes capturing, using the downward facing camera, an image at the delivery location and determining the second delivery point based on the image at the delivery location.

As mentioned, FIG. 13 is a block diagram of method 1300, in accordance with example embodiments.

At block 1302, method 1300 includes capturing, by a sensor on an unmanned aerial vehicle (UAV), an image of a delivery location.

At block 1304, method 1300 includes determining, based on the image of the delivery location, a segmentation image, where the segmentation image segments the delivery location into a plurality of pixel areas with corresponding semantic classifications.

At block 1306, method 1300 includes determining, based on the segmentation image, a percentage of obstacle pixels within a surrounding area of a delivery point at the delivery location, where each obstacle pixel has a semantic classification indicative of an obstacle in the delivery location.

At block 1308, method 1300 includes based on the percentage of obstacle pixels being above a threshold percentage, aborting a delivery process of the UAV.

In some examples, method 1300 includes determining, by a delivery point selection module, the delivery point at the delivery location and navigating, by the UAV, to the delivery point, where aborting the delivery process of the UAV is performed after determining the delivery point at the delivery location and after navigating to the delivery point.

Further, in some examples, determining the delivery point at the delivery location comprises determining an initial delivery point, determining that the initial delivery point is within a threshold distance of an obstacle, and selecting an adjusted delivery point which is at least the threshold distance away from the initial delivery point, where the adjusted delivery point is the delivery point at the delivery location.

In some examples, method 1300 is carried out during a descent process of the UAV, where aborting the delivery process of the UAV is aborting the descent process of the UAV.

In some examples, method 1300 includes capturing one or more additional images of the delivery location and determining, based on the one or more additional images of the delivery location, one or more additional segmentation images. Method 1300 further includes determining, based on the one or more additional segmentation images, one or more additional percentages of obstacle pixels within a surrounding area of a delivery point at the delivery location. Further, method 1300 also includes determining a total count of the one or more percentages of additional obstacle pixels and the percentage of obstacle pixels being above a threshold percentage and determining that the total count is greater than a threshold count, where aborting the delivery process of the UAV is further based on determining that the total count is greater than the threshold count.

In some examples, method 1300 includes capturing one or more additional images of the delivery location and determining, based on the one or more additional images of the delivery location, one or more additional segmentation images. Further, method 1300 includes determining, based on the one or more additional segmentation images, one or more additional percentages of obstacle pixels within a surrounding area of a delivery point at the delivery location. Method 1300 further includes determining an average percentage of the one or more additional percentages of obstacle pixels and the percentage of obstacle pixels and determining that the average percentage is greater than a threshold average percentage, where aborting the delivery process of the UAV is further based on determining that the average percentage is greater than the threshold average percentage.

In some examples, method 1300 includes capturing one or more additional images of the delivery location and determining, based on the one or more additional images of the delivery location, one or more additional segmentation images. Method 1300 further includes determining, based on the one or more additional segmentation images, one or more additional percentages of obstacle pixels within a surrounding area of a delivery point at the delivery location and determining an uncertainty measure based on the one or more additional percentages of obstacle pixels and the percentage of obstacle pixels, where aborting the delivery process of the UAV is further based on determining that the uncertainty measure is greater than a threshold uncertainty measure.

In some examples, method 1300 further includes capturing one or more additional images of the delivery location at a set time interval, where aborting the delivery process of the UAV is further based on the additional one or more images.

In some examples, method 1300 further includes descending the UAV to a predetermined altitude above the delivery location, where capturing the image of the delivery location is performed after descending to the predetermined altitude.

In some examples, the delivery point is a point over which the UAV is hovering when capturing the image of the delivery location.

In some examples, capturing the image of the delivery location comprises capturing a tilted image of the delivery location, and determining a percentage of obstacle pixels within a surrounding area of a delivery point at the delivery location is based on the tilted image of the delivery location.

In some examples, the image of the delivery location is a 2D image, and method 1300 further includes determining, based on the 2D image, a 3D depth image of the delivery location, where determining the percentage of obstacle pixels within the surrounding area of the delivery point at the delivery location is further based on the 3D depth image.

In some examples, the image of the delivery location is a 2D image, where determining the segmentation image is based on applying a pre-trained machine learning model to the image.

In some examples, the delivery process is to deliver a payload with one or more dimensions, where method 1300 further includes determining the threshold percentage based on the one or more dimensions of the payload.

In some examples, the sensor on the UAV faces downward, and where the image of the delivery location captured by the sensor is representative of the delivery location below the UAV.

In some examples, the semantic classifications are selected from a predetermined set of semantic classifications, where the predetermined set of semantic classifications includes at least semantic classifications corresponding to vegetation, building, and road.

In some examples, the sensor is a downward facing camera attached to the UAV, where the image of the delivery location captured by the downward facing camera is representative of the delivery location below the UAV.

In some examples, the UAV further includes a depth sensor, and method 1300 further includes capturing a depth image of the delivery location, where determining the percentage of obstacle pixels within the surrounding area of the delivery point at the delivery location is further based on the depth image.

XI. Experimental Results

Figure 14:
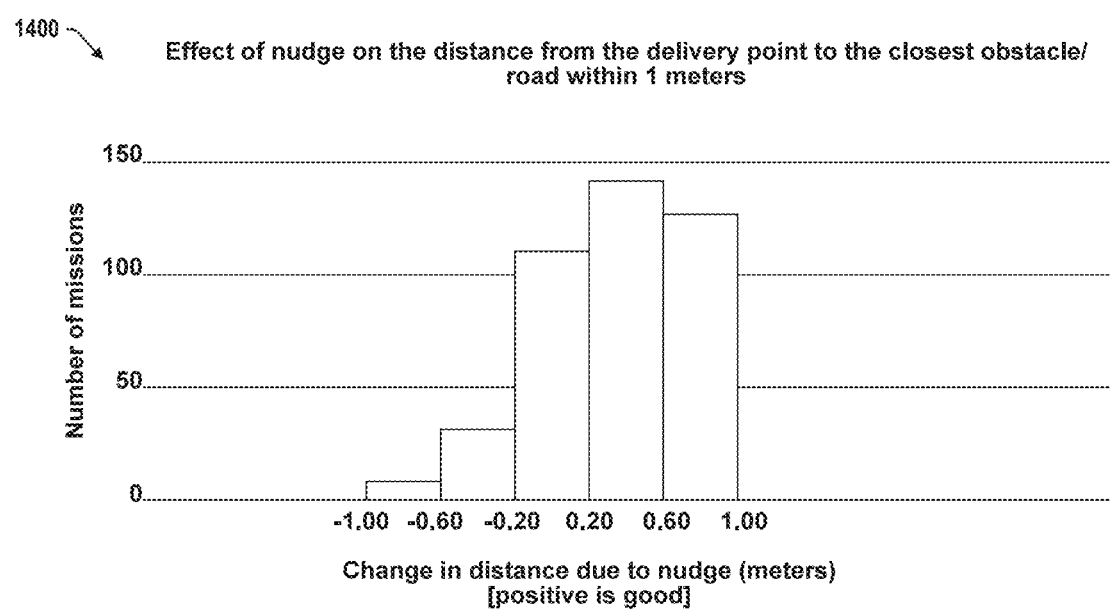
FIG. 14 is a diagram of experimental results, in accordance with example embodiments.

FIG. 14 depicts experimental results diagram 1400, in accordance with example embodiments. Experimental results diagram 1400 depicts the effect of nudge on the distance from the delivery point to the closest obstacle/road within one meter. As shown, for the majority of missions, a positive change in distance is observed, indicating that the nudged delivery point was farther away from obstacles and other unfavorable landing elements in the delivery location (e.g., roads). Because the nudged delivery points are generally farther away from obstacles and other unfavorable landing elements in the delivery location, the UAV may be able to successfully deliver payloads in a higher percentage of delivery processes/missions. Further this improvement may facilitate reducing the number of accidents and/or collisions during delivery processes/missions due to the nudged delivery point being generally farther away from obstacles and/or other unfavorable landing elements.

XII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above-detailed description describes various features and functions of the disclosed systems, devices, and methods with reference to the accompanying figures. In the figures, similar symbols typically identify similar components unless context dictates otherwise. The example embodiments described herein and in the figures are not meant to be limiting. Other embodiments can be utilized, and other changes can be made without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer-readable medium such as a storage device including a disk or hard drive or other storage medium.

The computer-readable medium may also include non-transitory computer-readable media such as computer-readable media that stores data for short periods of time like register memory, processor cache, and random access memory (RAM). The computer-readable media may also include non-transitory computer-readable media that stores program code or data for longer periods of time, such as secondary or persistent long-term storage, like read-only memory (ROM), optical or magnetic disks, compact-disc read-only memory (CD-ROM), for example. The computer-readable media may also be any other volatile or non-volatile storage systems. A computer-readable medium may be considered a computer-readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   capturing, by a sensor on an unmanned aerial vehicle (UAV), an image of a delivery location;
   determining, based on the image of the delivery location, a segmentation image, wherein the segmentation image segments the delivery location into a plurality of pixel areas with corresponding semantic classifications;
   determining, based on the segmentation image, a distance-to-obstacle image of a delivery zone at the delivery location, wherein the distance-to-obstacle image comprises a plurality of pixels, each pixel representing a distance in the segmentation image from a nearest pixel area with a semantic classification indicative of an obstacle in the delivery location;
   selecting, based on the distance-to-obstacle image, a delivery point in the delivery zone; and
   positioning the UAV above the delivery point in the delivery zone for delivery of a payload.

2. The method of claim 1, wherein the delivery point is a second delivery point, wherein the method further comprises:
   navigating, by the UAV, above a first delivery point in the delivery zone;
   after navigating above the first delivery point, descending to an altitude above the first delivery point, wherein positioning the UAV above the second delivery point in the delivery zone is performed after descending to the altitude above the first delivery point.

3. The method of claim 1, wherein the delivery point is a second delivery point, wherein the delivery zone is a surrounding area around a first delivery point at the delivery location.

4. The method of claim 3, wherein the method further comprises:
   determining a first distance from the first delivery point to a first nearest pixel area; and
   determining that the first distance is lower than a threshold value, wherein determining the distance-to-obstacle image of the delivery zone at the delivery location is in response to the determination that the first distance is lower than the threshold value.

5. The method of claim 1, wherein selecting the delivery point in the delivery zone comprises:
   determining, based on the distance-to-obstacle image of the delivery zone at the delivery location, a respective distance between a center delivery point of the delivery zone and a respective nearest pixel area with a semantic classification indicative of an obstacle in the delivery location;
   determining that the respective distance is greater than a threshold distance; and
   in response to determining that the respective distance is greater than the threshold distance, selecting the center delivery point as the delivery point in the delivery zone.

6. The method of claim 1, wherein determining the distance-to-obstacle image of the delivery zone at the delivery location comprises for a pixel of the delivery zone:
   determining a corresponding nearest pixel area with a semantic classification indicative of an obstacle for the pixel of the delivery zone, wherein the corresponding nearest pixel area is outside the delivery zone.

7. The method of claim 1, wherein the image of the delivery location is a 2-dimensional (2D) image, wherein the method further comprises:
   determining, based on the 2D image, a 3-dimensional (3D) depth image of the delivery location, wherein selecting the delivery point is further based on the 3D depth image.

8. The method of claim 1, wherein selecting the delivery point in the delivery zone is based on the delivery point having a farthest distance from any obstacle determined from the segmentation image.

9. The method of claim 1, wherein selecting the delivery point in the delivery zone is based on the delivery point having a farthest distance from a tallest obstacle determined from the segmentation image.

10. The method of claim 1, wherein selecting the delivery point in the delivery zone is based on the delivery point having a farthest distance from obstacles with a particular classification determined from the segmentation image.

11. The method of claim 1, wherein the image of the delivery location is a 2D image, wherein determining the segmentation image is based on applying a pre-trained machine learning model to the image.

12. The method of claim 1, wherein determining the distance-to-obstacle image of the delivery zone at the delivery location comprises determining a 2D lateral distance measurement.

13. The method of claim 1, wherein determining the distance-to-obstacle image of the delivery zone comprises, for each respective pixel of the segmentation image within the delivery zone:
 determining a set of distances between the respective pixel of the delivery zone and one or more pixel areas with a semantic classification indicative of an obstacle in the delivery location;
 selecting a lowest distance value from the set of distances; and
 setting a respective distance at the respective pixel to be the lowest distance value.

14. The method of claim 1, wherein the method further comprises:
 capturing one or more additional images of the delivery location;
 determining, based on the one or more additional images of the delivery location, one or more additional segmentation images;
 determining, based on the one or more additional segmentation images, one or more additional distance-to-obstacle images of the delivery zone at the delivery location;
 selecting, based on the one or more additional distance-to-obstacle images, one or more additional delivery points in the delivery zone; and
 determining that the delivery point and the one or more additional delivery points are within a particular area surrounding the delivery point, wherein positioning the UAV above the delivery point is in response to determining that the delivery point and the one or more additional delivery points are within the particular area surrounding the delivery point.

15. The method of claim 1, wherein the method further comprises:
 capturing one or more additional images of the delivery location;
 determining, based on the one or more additional images of the delivery location, one or more additional segmentation images;
 determining, based on the one or more additional segmentation images, one or more additional distance-to-obstacle images of the delivery zone at the delivery location;
 selecting, based on the one or more additional distance-to-obstacle images, one or more additional delivery points in the delivery zone;

determining that the delivery point and the one or more additional delivery points are not within a particular area surrounding the delivery point; and
 in response to determining that the delivery point and the one or more additional delivery points are not within a particular area surrounding the delivery point, aborting the delivery of the payload.

16. The method of claim 1, wherein selecting the delivery point in the delivery zone comprises:
 determining a first value in a first direction and a second value in a second direction relative to the UAV, wherein the first value in the first direction and the second value in the second direction are representative of the delivery point relative to a current position of the UAV.

17. An unmanned aerial vehicle (UAV), comprising:
 a sensor; and
 a control system configured to:
  capture, by the sensor on the UAV, an image of a delivery location;
  determine, based on the image of the delivery location, a segmentation image, wherein the segmentation image segments the delivery location into a plurality of pixel areas with corresponding semantic classifications;
  determine, based on the segmentation image, a distance-to-obstacle image of a delivery zone at the delivery location, wherein the distance-to-obstacle image comprises a plurality of pixels, each pixel representing a distance in the segmentation image from a nearest pixel area with a semantic classification indicative of an obstacle in the delivery location;
  select, based on the distance-to-obstacle image, a delivery point in the delivery zone; and
  position the UAV above the delivery point in the delivery zone for delivery of a payload.

18. The UAV of claim 17, further comprising a depth sensor, wherein the control system is further configured to:
 capture a depth image of the delivery location; and
 adjust horizontal positioning of the UAV from the delivery point during UAV descent based on the depth image.

19. The UAV of claim 17, wherein the sensor is a camera, wherein the camera faces downward, and wherein the image captured by the camera is representative of the location below the UAV.

20. A non-transitory computer readable medium comprising program instructions executable by one or more processors to perform operations, the operations comprising:
 capturing, by a sensor on an unmanned aerial vehicle (UAV), an image of a delivery location;
 determining, based on the image of the delivery location, a segmentation image, wherein the segmentation image segments the delivery location into a plurality of pixel areas with corresponding semantic classifications;
 determining, based on the segmentation image, a distance-to-obstacle image of a delivery zone at the delivery location, wherein the distance-to-obstacle image comprises a plurality of pixels, each pixel representing a distance in the segmentation image from a nearest pixel area with a semantic classification indicative of an obstacle in the delivery location;
 selecting, based on the distance-to-obstacle image, a delivery point in the delivery zone; and
 positioning the UAV above the delivery point in the delivery zone for delivery of a payload.

* * * * *